United States Patent
Kuo et al.

(10) Patent No.: US 12,187,099 B2
(45) Date of Patent: Jan. 7, 2025

(54) AUTOFILL OVERFILL PROTECTION TEMPERATURE SENSING AIR CONDITIONING COOLANT RECHARGE

(71) Applicant: Pacific Link, L.L.C., Richardson, TX (US)

(72) Inventors: Alexander M. Kuo, Dallas, TX (US); Bruce Riggs, Austin, TX (US)

(73) Assignee: Pacific Link, L.L.C., Richardson, TX (US)

( * ) Notice: Subject to any disclaimer, the term of this patent is extended or adjusted under 35 U.S.C. 154(b) by 0 days.

(21) Appl. No.: 18/320,651

(22) Filed: May 19, 2023

(65) Prior Publication Data

US 2023/0364970 A1    Nov. 16, 2023

Related U.S. Application Data

(63) Continuation of application No. PCT/US2021/072524, filed on Nov. 19, 2021.
(Continued)

(51) Int. Cl.
*B60H 1/00*    (2006.01)

(52) U.S. Cl.
CPC .... *B60H 1/00978* (2013.01); *F25B 2345/003* (2013.01); *F25B 2700/04* (2013.01)

(58) Field of Classification Search
CPC ............. B60H 1/00978; F25B 2700/04; F25B 49/005; F25B 2345/003; F25B 2345/001; F25B 2345/006

See application file for complete search history.

(56) References Cited

U.S. PATENT DOCUMENTS

| 1,595,521 A | 8/1926 | Meyer |
| 2,170,173 A | 8/1939 | Wheatley |
| (Continued) | | |

FOREIGN PATENT DOCUMENTS

| CN | 107763911 | 3/2020 |
| GB | 1273660 | 5/1972 |
| WO | 2009018624 | 2/2009 |

OTHER PUBLICATIONS

Editors of the American Heritage Dictionaries (Ed.). (2016). Vent 1. In the American Heritage(R) Dictionary of the English Language (6th ed.). Houghton Mifflin. https://search.credoreference.com/articles/Qm9va0FydGljbGU6NDUwMjM2Nw==?aid=279753.*

(Continued)

*Primary Examiner* — Tavia Sullens
(74) *Attorney, Agent, or Firm* — Leber IP Law; Celia H. Leber

(57) ABSTRACT

Air conditioning temperature measurement device for use with a valve actuated refrigerant recharge assembly operates in conjunction with a pressurized refrigerant bottle and a-remote temperature sensor enabled by radio frequency (RF) wireless communication. Sampled temperatures at an output vent of an air-conditioned cabin and rate of temperature change at the inlet modulate recharge of refrigerant into low pressure side of a phase change A/C control system. Automated sensing of the rate of temperature change in an air conditioner outlet vent, and modulation of refrigerant refill rate, ensure sufficient refrigerant is introduced to improve cooling efficiency while overfill is prevented by refrigerant valve control as rate of temperature change approaches a parabolic minimum. System controls for insufficient change in absolute temperature and inverted relationship in rate of temperature change to prevent recharge of unstable air conditioning system, thereby limiting the dis- (Continued)

charge of gases that contribute to greenhouse gas accumulation in the upper atmosphere.

4 Claims, 21 Drawing Sheets

Related U.S. Application Data

(60) Provisional application No. 63/115,959, filed on Nov. 19, 2020.

(56) References Cited

U.S. PATENT DOCUMENTS

| | | | |
|---|---|---|---|
| 2,805,035 A | 9/1957 | Coombs | |
| 3,010,520 A | 11/1961 | Seaberg | |
| 3,100,391 A | 8/1963 | Mansfield | |
| 3,635,086 A | 1/1972 | Beruck | |
| 3,695,055 A | 10/1972 | Bruce | |
| 4,282,754 A | 8/1981 | Provasnik | |
| 4,337,917 A | 7/1982 | Tesack et al. | |
| 4,381,549 A | 4/1983 | Stamp, Jr. et al. | |
| 4,772,132 A | 9/1988 | Hofmann | |
| 4,827,730 A | 5/1989 | Doi et al. | |
| 5,249,963 A | 10/1993 | McGarrigle | |
| 5,295,747 A | 3/1994 | Vinci | |
| 5,324,114 A | 6/1994 | Vinci | |
| 5,367,888 A | 11/1994 | Muston et al. | |
| 5,518,176 A | 5/1996 | Turner et al. | |
| 5,655,379 A * | 8/1997 | Jaster | F25B 41/315 251/129.05 |
| 5,741,069 A | 4/1998 | Egel | |
| 5,762,236 A | 6/1998 | Foster et al. | |
| 5,809,795 A * | 9/1998 | Beaverson | F25B 41/315 62/218 |
| 6,000,845 A | 12/1999 | Tymkewicz et al. | |
| 6,539,988 B1 | 4/2003 | Cowan et al. | |
| 6,675,829 B2 | 1/2004 | Moore, Jr. et al. | |
| 8,079,226 B2 | 12/2011 | Brown et al. | |
| 8,682,526 B2 | 3/2014 | Mola et al. | |
| 9,273,888 B2 | 3/2016 | McMasters | |
| 10,408,515 B2 | 9/2019 | Bonifaccino | |
| 10,473,529 B2 | 11/2019 | Bronk et al. | |
| 2003/0158704 A1 | 8/2003 | Triginal et al. | |
| 2005/0217285 A1 | 10/2005 | Carrubba et al. | |
| 2005/0262855 A1 | 12/2005 | Hsieh et al. | |
| 2006/0101835 A1 | 5/2006 | Meldahl | |
| 2007/0266717 A1 * | 11/2007 | Goodremote | B60H 1/00978 62/149 |
| 2007/0294005 A1 | 12/2007 | Kerschl | |
| 2008/0216491 A1 | 9/2008 | Quest et al. | |
| 2009/0057313 A1 | 3/2009 | Alvares | |
| 2009/0113901 A1 | 5/2009 | Carrubba et al. | |
| 2011/0137522 A1 | 6/2011 | Mola et al. | |
| 2012/0192576 A1 | 8/2012 | Carrubba | |
| 2013/0008192 A1 | 1/2013 | McMasters et al. | |
| 2013/0142669 A1 | 6/2013 | Pyle et al. | |
| 2013/0319025 A1 | 12/2013 | Wagaman et al. | |
| 2014/0014860 A1 | 1/2014 | Cloud et al. | |
| 2014/0197170 A1 | 7/2014 | Carlile et al. | |
| 2014/0260350 A1 | 9/2014 | McMasters | |
| 2014/0260352 A1 | 9/2014 | Murray | |
| 2014/0264111 A1 | 9/2014 | Porter et al. | |
| 2015/0159930 A1 | 6/2015 | McMasters et al. | |
| 2015/0267950 A1 | 9/2015 | Lundberg et al. | |
| 2015/0308879 A1 | 10/2015 | Pistone et al. | |
| 2015/0330351 A1 | 11/2015 | Ragazzi et al. | |
| 2016/0045056 A1 | 2/2016 | Kent | |
| 2017/0174042 A1 | 6/2017 | Kuo et al. | |
| 2017/0232940 A1 | 8/2017 | Kuo et al. | |
| 2017/0349028 A1 * | 12/2017 | Graaf | B60H 1/00978 |
| 2018/0010832 A1 | 1/2018 | Bonifaccino | |
| 2019/0009338 A1 | 1/2019 | Bonifaccino | |
| 2019/0009638 A1 * | 1/2019 | Bonifaccino | B60H 1/00885 |
| 2019/0168572 A1 | 6/2019 | Kuo et al. | |
| 2019/0173277 A1 | 6/2019 | Kincaid et al. | |
| 2019/0382169 A1 | 12/2019 | Schlegel | |
| 2020/0281137 A1 | 9/2020 | Heaney | |

OTHER PUBLICATIONS

Collins Dictionaries (Ed.). (2014). Vent1. In Collins English Dictionary (12th ed.). Collins. https://search.credoreference.com/articles/Qm9va0FydGljbGU6Mzc1MjlxOA==?aid=279753.*
U.S. Appl. No. 16/949,020, Non-Final Office Action dated Sep. 23, 2022, 29 pages.
International Search Report and Written Opinion for International Application No. PCT/US2019/026679, dated Jul. 1, 2019, 10 Pages.
International Search Report and Written Opinion for International Application No. PCT/US2021/072524, dated Mar. 30, 2022, 17 Pages.
Partial Certified English translation of CN 107763911, 3 pages.

* cited by examiner

SECTION C-C

FIG. 4C-C

FILL LOGIC TABLE

| Base Case Time | Register 1 Initial T₁ (°C) | Register 2 Sampled T₂ (°C) | Register 3 Delta Temp (T₂-T₁) | Action | Vent Temp Sensor |
|---|---|---|---|---|---|
| 0m 0s | 35.0 | 35.0 | 0.0 | Initialize App | Broadcasting temp open |
| 0m 5s | 35.0 | 35.0 | 0.0 | Initialize Controller | Broadcasting temp. |
| 0m 10s | 35.0 | 35.0 | 0.0 | Initialize Complete R134a Valve Closed | Broadcasting temp. |
| 0m 15s | 35.0 | 35.0 | 0.0 | R134a Valve Opening | Broadcasting temp. |
| 0m 20s | 35.0 | 34.5 | -0.5 | R134a Valve Open | Broadcasting temp. |
| 0m 25s | 34.5 | 34.0 | -0.5 | R134a Valve Open | Broadcasting temp. |
| 0m 30s | 35.0 | 33.5 | -1.5 | R134a Valve Open | Broadcasting temp. |
| 0m 35s | 33.5 | 31.5 | -2.0 | R134a Valve Open | Broadcasting temp. |
| 0m 40s | 31.5 | 29.0 | -2.5 | R134a Valve Open | Broadcasting temp. |
| 0m 45s | 29.0 | 26.5 | -2.5 | R134a Valve Open | Broadcasting temp. |
| 0m 50s | 26.5 | 24.0 | -2.5 | R134a Valve Open | Broadcasting temp. |
| 0m 55s | 24.0 | 22.0 | -2.0 | R134a Valve Open | Broadcasting temp. |
| 1m 0s | 22.0 | 20.0 | -2.0 | R134a Valve Open | Broadcasting temp. |
| 1m 5s | 20.0 | 18.5 | -1.5 | R134a Valve Open | Broadcasting temp. |
| 1m 10s | 18.5 | 17.0 | -1.5 | R134a Valve Open | Broadcasting temp. |
| 1m 15s | 17.0 | 16.0 | -1.0 | R134a Valve Open | Broadcasting temp. |
| 1m 20s | 16.0 | 15.5 | -0.5 | R134a Valve Open | Broadcasting temp. |
| 1m 25s | 15.5 | 15.0 | -0.5 | R134a Valve Open | Broadcasting temp. |
| 1m 30s | 15.0 | 15.0 | 0.0 | R134a Valve Closed | Broadcasting temp. |
| 1m 35s | 15.0 | 15.0 | 0.0 | R134a Valve Closed | Broadcasting temp. |
| 1m 40s | 15.0 | 15.0 | 0.0 | Motor Controller Off | Broadcasting temp. |
| 1m 45s | 15.0 | 15.0 | 0.0 | --- | --- |
| 1m 50s | 15.0 | 15.0 | 0.0 | --- | --- |

FIG. 12A

FILL LOGIC TABLE

| MyAccufill System Components | | | |
|---|---|---|---|
| Smart Phone App | Smart App Messaging | Motor Controller PCBA | Est. Valve Position |
| Temp sensor recognized T₀ | Accufill System Initializing | Initialize Controller | 0° |
| Temp within activation range >0C Temp <50C | Ambient °C within normal fill temperature range | Motor presence detect | 0° |
| Temp within activation range >0C Temp <50C | Accufill initialization Complete | Control IC power good | 0° |
| Motor Controller Opening +0.5πrad | Refrigerant fill in process | Rotate controller valve 90° | 45° |
| Motor Controller Open 0.5πrad | Refrigerant fill in process | Hold Position Open | 90° |
| Motor Controller Open +0.5πrad | Refrigerant fill in process ≥5.0% Complete | Rotate controller valve +90° | 135° |
| Motor Controller @ 1.0πrad | Refrigerant fill in process: 7.5% Complete | Hold Position Open | 180° |
| Motor Controller @ 1.0πrad | Refrigerant fill in process ≥17.5% Complete | Hold Position Open | 180° |
| Motor Controller @ 1.0πrad | Refrigerant fill in process: 30% Complete | Hold Position Open | 180° |
| Motor Controller @ 1.0πrad | Refrigerant fill in process ≥42.5% Complete | Hold Position Open | 180° |
| Motor Controller @ 1.0πrad | Refrigerant fill in process: 55% Complete | Hold Position Open | 180° |
| Motor Controller @ 1.0πrad | Refrigerant fill in process ≥65.0% Complete | Hold Position Open | 180° |
| Motor Controller @ 1.0πrad | Refrigerant fill in process: 75% Complete | Hold Position Open | 180° |
| Motor Controller @ 1.0πrad | Refrigerant fill in process ≥82.5% Complete | Hold Position Open | 180° |
| Motor Controller Closing -0.5πrad | Refrigerant fill in process: 90% Complete | Rotate controller valve -90° | 135° |
| Motor Controller Open 0.5πrad | Refrigerant fill rate slowing ≥95% Complete | Hold Position Open | 90° |
| Motor Controller Open 0.5πrad | Refrigerant fill rate slowing ≥97.5% Complete | Hold Position Open | 90° |
| Motor Controller Close -0.5πrad | Refrigerant fill complete ≥Vent temp | Rotate controller valve -90° | 45° |
| ΔT = 0, App "System Stable" | A/C performance stable | Hold Position Closed | 0° |
| ΔT = 0, System Stable | A/C performance stable | Hold Position Closed | 0° |
| ΔT = 0, System Stable | Please disconnect the Accufill hose coupling from the refrigerant inlet connector | Power Off | — |
| — | Please reclaim the temp sensor from the A/C vent and... | — | — |
| — | Congratulations! A/C project complete! Please rate your fill rate experience: | — | — |

FIG. 12B

FILL LOGIC TABLE

| Base Case Time | Register 1 Initial $T_i$ (°C) | Register 2 Sampled $T_s$ (°C) | Register 3 Delta Temp ($T_s$-$T_i$) | Action | Vent Temp Sensor |
|---|---|---|---|---|---|
| 0m 0s | 35.0 | 35.0 | 0.0 | Initialize App | Broadcasting temp open |
| 0m 5s | 35.0 | 35.0 | 0.0 | Initialize Controller | Broadcasting temp. |
| 0m 10s | 35.0 | 35.0 | 0.0 | Initialize Complete R134a Valve Closed | Broadcasting temp. |
| 0m 15s | 35.0 | 35.0 | 0.0 | R134a Valve Opening | Broadcasting temp. |
| 0m 20s | 35.0 | 34.5 | -0.5 | R134a Valve Open | Broadcasting temp. |
| 0m 25s | 35.0 | 34.0 | -1.0 | R134a Valve Open | Broadcasting temp |
| 0m 30s | 35.0 | 33.5 | -1.5 | R134a Valve Open | Broadcasting temp. |
| 0m 35s | 33.5 | 34.5 | 1.0 | R134a Valve Open | Broadcasting temp |
| 0m 40s | 34.5 | 35.0 | 0.5 | R134a Valve Closed | Broadcasting temp. |
| 0m 45s | 35.0 | 35.0 | 0.0 | R134a Valve Closed | Broadcasting temp. |
| 0m 50s | --- | --- | --- | --- | --- |

FIG. 13A

FILL LOGIC TABLE

| MyAccufill System Components | | | |
|---|---|---|---|
| Smart Phone App | Smart App Messaging | Motor Controller PCBA | Est. Valve Position |
| Temp sensor recognized $T_0$ | Accufill System Initializing | Initialize Controller | 0° |
| Temp within activation range: >0C Temp <50C | Ambient °C within normal fill temperature range | Motor presence detect | 0° |
| Temp within activation range: >0C Temp <50C | Accufill Initialization Complete | Control IC power good | 0° |
| Motor Controller Opening: +0.5πrad | Refrigerant fill in process | Rotate controller valve 90° | 45° |
| Motor Controller Open 0.5πrad | Refrigerant fill in process | Hold Position Open | 90° |
| Motor Controller Open +0.5πrad | Refrigerant fill in process: 5.0% Complete | Rotate controller valve +90° | 135° |
| Motor Controller @ 1.0πrad | Refrigerant fill in process: 7.5% Complete | Hold Position Open | 180° |
| $\Delta T \geq 0$, App "System Unstable" | System Unstable Suspect Open System | Rotate controller valve -90° | 90° |
| $\Delta T \geq 0$, App "System Unstable" | Refrigerant fill stopped Call 1-800-AccuAir | Rotate controller valve -90° | 0° |
| $\Delta T \geq 0$, App "System Unstable" | Please disconnect the Accufill hose coupling from the refrigerant inlet connector | Hold Position Closed | 0° |
| — | Suspect Open System Call 1-800-AccuAir | Power Off | — |

FIG. 13B

AUTOFILL OVERFILL PROTECTION TEMPERATURE SENSING AIR CONDITIONING COOLANT RECHARGE

RELATED APPLICATIONS

This application is a continuation of International Patent Application No. PCT/US2021/72524, filed Nov. 19, 2021, which claims priority from U.S. Provisional Patent Application No. 63/115,959, filed, Nov. 19, 2020, the entire disclosures of which are incorporated herein by reference.

FIELD OF THE INVENTION

The system, apparatus and methods disclosed herein relate to an air conditioning (A/C) refrigerant recharge system inclusive of dynamic temperature sensing, conditional fill rate modulation and overfill protection for use in mobile A/C systems inclusive of automobiles, light trucks, recreational vehicles and travel trailers with both engine driven and electronic air conditioning compressors.

BACKGROUND OF THE INVENTION

Automotive air conditioning systems typically include three main components: (1) a compressor, (2) a condenser, and (3) an evaporator. A compressor is a pump driven by a belt attached to the engine's crankshaft and/or an electric pump with a discrete power source. In a multi-compressor system such as an RV both types of compressors may be present. Refrigerant is drawn into the compressor in a low-pressure gaseous form. As refrigerant is drawn in, the pump pressurizing the gas, increasing temperature and absorbing latent heat. From the compressor, compressed gas moved into the condenser on the high-pressure side of the air conditioning system. The condenser circulates a refrigerant condensate through a series of tubes in the path of a blower. Air moving across the tubes causes the refrigerant to further condense and to absorb latent. Consistent with the 2nd Law of Thermodynamics, thermal energy flows moves from hot to cold. Accordingly, in the third component of the system, the condensed, high temperature gas, moves through an expansion valve and into the evaporator. In this phase change system, the evaporator allows the refrigerant condensate to expand very quickly, increasing volume, reducing pressure, and to our purpose, reducing temperature consistent with the ideal gas law. Rapidly cooling gas then enters the evaporator coils in the path of a second blower or fan. Expanded gas cools the evaporator coils cool and, in turn, the adjacent air as it enters the air conditioned cabin.

In such an air conditioning systems, the efficiency of cooling during the compression and expansion cycles of a gaseous refrigerant varies with the level of refrigerant present in the system. For numerous reasons, refrigerant may slowly leak from the air conditioning system. As such, an automobile air conditioning system may require routine monitoring of the refrigerant level and the ability to sustain a pressure differential between the high and low sides of the system. The gradually loss of refrigerant is especially common to older vehicles with mechanical hose fittings. It is estimated that approximately 180 million vehicles worldwide are in need of a recurrent recharging of their air conditioning systems at a time when worldwide temperatures are steadily increasing due to climate change caused by greenhouse gas emissions.

To allow the recharge of refrigerant, automotive air conditioners generally provide a service or coolant port to introduce new refrigerant and to inspect for low side pressures and the presence of moisture during the air conditioning cycle. Although recharge and inspection may be performed by service professionals, a significant number of automobile owners prefer to perform this routine inspection and replenishment on their own vehicles, in part due to the monetary and time savings obtained. In addition, one method of recharging of automotive air conditioner refrigerant as is typically performed by service professionals involves the complete evacuation of the refrigerant, followed by recharging the air conditioner with a full charge of refrigerant according to vehicle service specifications. This method is both time consuming and expensive and also a source of the release of refrigerants into the atmosphere that add to greenhouse gas accumulations that affect climate change. Service professionals that do perform recycling of refrigerant to prevent release of refrigerant into the atmosphere are required to possess expensive recycling and evacuation equipment that requires training due to its difficulty of use.

Another method used by service professionals for recharging refrigerant and measuring pressure or other parameters in automobile air conditioners is using a set of manifold gauges. Recharging using manifold gauges typically includes three hoses and two gauges; wherein one hose connects to a low-pressure service port; one hose connects to a high-pressure service port; and a third hose connects to the source of refrigerant. The gauges are then used to measure the pressure at the service ports. Although manifold gauges may be a standard tool used by service professionals, a number of disadvantages may reduce their popularity among general consumers. These disadvantages include: being complicated to use; requiring the user to know the approximate ambient temperature; requiring a user to look up the pressure readings of the gauges on a chart to determine if there is sufficient refrigerant in the system, requiring a user to know the correct pressure readings for each automobile make and model; presenting a high up-front costs of equipment that is infrequently used. An innovative way for providing a recharging of refrigerant and measuring the pressure of coolant systems using an adaptable bottle actuator assembly capable of interoperating with various forms of pressurized bottles is described in U.S. patent application Ser. No. 14/680,066, which is incorporated by reference herein, in its entirety.

Other prior art systems disclose methods and devices for measuring the temperature of the refrigerant on the low side of the air conditioning cycle. However, for most non-professionals, this remains a difficult task. Additionally, measuring temperature of the refrigerant at the service port is not reliable for all vehicles due to variation of air conditioning technologies. Automotive air conditioning systems are evolving to achieve higher efficiencies and to improve cooling capacity. Among these changes are a shift in how coolant is released and used. One such change is a move from the use of a fixed orifice system, whereas the release of coolant from low pressure to high pressure is through a fixed or static opening which results in inefficient cooling, to the use of a thermal expansion system, whereas the release of coolant is dependent upon a dynamic pressure in the system and changes as the system requires. This makes the measurement of pressure at the service port unstable and frequently results in the over filling of refrigerant requiring the user to release the over filled gas into the atmosphere causing damage to the environment. Additionally, many car manufacturers are independently designing unique air conditioning systems to realize better efficiencies during use. These include systems that are adaptable to different car design limitations such as space limitations in the engine compartment and energy usage and its effect on vehicle performance. These independent designs also make the measurement of pressure of one service port difficult due to the user needing to know the exact pressure requirements and specifications of their individual vehicle. Despite the evolving automotive air conditioning technology independent of all parameters is the optimal air conditioning output temperature. Therefore, there is a need to measure the temperature of the air at the vehicle air conditioning vent(s) and the rate of change in the inlet temperature, to ensure that sufficient refrigerant has been introduced into the system.

The servicing of coolant in automobile air conditioning systems typically first requires the user to engage the compressor, either by starting the engine or powering the compressor in an electric vehicle, so that the air conditioner may actively cycle. To fill refrigerant, the user must be outside the vehicle, near the coolant service port, while the engine is running. Leaving the coolant service port to check the air conditioner vent temperature inside the vehicle requires the user to either (1) disconnect the refrigerant bottle by reaching a hand/arm into a running engine, which poses a risk of injury to the user, or (2) leave a pressurized coolant bottle connected and place it on top of a running engine, which poses a risk if the bottle falls into the engine damaging the engine or causes bodily injury to the user or others around the user. Therefore, there is a need to measure the cabin inlet temperature at one or more of the vehicle air conditioning vents inside the vehicle while the user remains at the vehicle coolant port outside the vehicle to continuously determine the sufficiency of the refrigerant added to the coolant system while maintaining control of the pressurized bottle.

Other known systems disclose methods and devices provide an apparatus and methods for measuring output vent temperature to ensure the proper amount of coolant for refilling or servicing a coolant system, such as an automobile coolant system. In one such device, an apparatus includes a measurement display for viewing the temperature of air conditioning output inside a vehicle while the user is outside the vehicle refilling or servicing a coolant system. The measurement display is in communications with a temperature sensor measuring the air temperature at a vent inside the vehicle to allow a user to ensure the proper amount of coolant is refilled. Such methods and apparatus are described in U.S. patent application Ser. No. 15/045,242, which is incorporated by reference herein, in its entirety.

Nonetheless, existing methods and apparatus remain susceptible to user overfilling. To the non-professional, do-it-yourself user of air conditioning recharging systems, more refrigerant is typically deemed better. The typical user tendency to overfill an air conditioning system beyond is efficient fill capacity leads to a decrease in the effective cooling of the automobile. Additionally, overfilling can cause the failure of the air conditioning system by over-pressuring the system or by failing to provide sufficient space for the expansion of gases in the low pressure cooling section of the system. Furthermore, non-professionals and do-it-yourselfers do not readily appreciate when an air conditioning system is defective, leaks, or is otherwise unable to receive and hold refrigerant. Thus, there is a need for methods and apparatus to prevent users from overfilling an air conditioning system as well as recognizing and stopping the filling of refrigerant of defective automobile air conditioning systems.

Various apparatus and system embodiments of the present invention may be used that are adaptable to a bottle actuator assembly for use with various pressurized bottles. Embodiments of the present invention automatically determine the sufficiency of the refrigerant level in an automobile air conditioner, and add refrigerant as needed, while preventing overfilling and protecting against damage and excess emissions of refrigerant into the atmosphere. Additional advantages of embodiments of the invention are set forth, in part, in the description which follows and, in part, will be apparent to one of ordinary skill in the art from the description and/or from the practice of the invention.

SUMMARY OF THE INVENTION

An apparatus and method for measuring the proper amount of coolant for recharging or servicing a coolant system, such as an automobile coolant system, are disclosed. Automated sensing and control of the method and apparatus described herein allow a non-professional to easily, safely, and accurately recharge an air conditioning system while ensuring that sufficient coolant has been filled, and not overfilled, thereby maintaining the efficiency of the coolant system and for providing sufficiently cooled air to cool the inside of the automobile.

In a first aspect of the invention, there is a system for servicing a vehicle coolant system, the system comprising a temperature sensor for measuring the temperature of air output at an air conditioning vent inside a vehicle; an autofill device for actuating a refrigerant fill valve in fluid communication with the vehicle coolant system and a refrigerant source; and a portable computer device in communication with the temperature sensor and the autofill device. In some embodiments, the portable computer device may be configured to receive temperature sensor information from the temperature sensor; determine from the temperature sensor information the change in temperature from a first time interval to a second time interval; and, from the received temperature information, the change in temperature and an elapsed time at successive time intervals, actuate the refrigerant fill valve via the autofill device based on the received temperature sensor information, thereby causing the recharging of the vehicle coolant system while preventing overfilling, underfilling, and the discharge of refrigerant into a defective or leaking vehicle coolant system.

In further embodiments, the first aspect may include a temperature sensor that is a wireless temperature sensor, wherein the temperature sensor transmits temperature sensor information at periodic intervals via a wireless communications protocol. In other embodiments, the autofill device of the system may comprise a motor controller unit (MCU), a wireless receiver, a dc motor controller; and a bi-directional dc motor in communication with the dc motor controller and refrigerant fill valve. Some embodiments may transmit and receive temperature sensor information in degrees Celsius, Fahrenheit, or as a digital value representing the temperature at the output vent of the vehicle coolant system.

In a second aspect, there is an autofill device for servicing a vehicle coolant system, the autofill device in fluid communication with the vehicle coolant system and a refrigerant source. In one embodiment, the autofill device may comprise a refrigerant fill valve; and a motor controller unit (MCU) in communication with the refrigerant fill valve, wherein the motor controller unit receives fill valve actuating commands from a portable computer device, and wherein the autofill device is configured to: actuate the refrigerant fill valve based on the received actuation commands, thereby causing the recharging of the vehicle coolant system while preventing overfilling, underfilling, and the discharge of refrigerant into a defective or leaking vehicle coolant system.

In some embodiments of the second aspect the autofill device may comprise a motor controller unit (MCU) having a Bluetooth low energy (BLE) wireless receiver. In further embodiments, the motor controller unit (MCU) may receive refrigerant fill actuating commands from a portable computer device via one-way wireless communications. In still further embodiments, the autofill device may further comprise: a dc motor controller in communication with the motor controller unit (MCU) and a bi-directional dc motor in communication with the dc motor controller and the refrigerant fill valve, wherein the actuating of the refrigerant fill valve by the portable computing device includes transmitting commands to the MCU for the opening and closing of the refrigerant fill valve via the dc motor controller.

In a third aspect, there is a portable computer device for servicing a vehicle coolant system, the portable computer device comprising: a processor and a memory configured to store data and instructions for execution by the processor, the instructions when executed by the processor configured to cause the processor to: receive temperature sensor information from a temperature sensor transmitting temperature sensor information at an output vent of an air conditioning system; determine from the temperature sensor information the change in temperature from a first time interval to a second time interval; and, from the received temperature information, the change in temperature and an elapsed time at successive time intervals, actuate the refrigerant fill valve via the autofill device based on the received temperature sensor information, thereby causing the recharging of the vehicle coolant system while preventing overfilling, underfilling, and the discharge of refrigerant into a defective or leaking vehicle coolant system.

In some embodiments of the third aspect, the portable computer device may further comprise instructions configured to implement a Boolean conditional logic controller. In other embodiments, the portable computer device may implement the Boolean conditional logic controller comprising instructions for controlling a Boolean logic state machine. In still further embodiments, the portable computer device may include instructions configured to actuate the refrigerant fill valve via the autofill device based on the received temperature sensor information, comprise instructions to actuate the refrigerant fill valve based on the change in temperature at a current time interval to the temperature at a previous time interval.

In further embodiments of the third aspect, the portable computer device may actuate of the refrigerant fill valve via the autofill device wherein the actuating is based on a threshold change in temperature at sample time intervals. In still further embodiments, the portable computer device may actuate of the refrigerant fill valve via the autofill device based on detection of a peak change in temperature at one or more sample time intervals. In these and other embodiments, the portable computer device may base the actuating of the refrigerant fill valve via the autofill device on the detection of a peak change in temperature. In some embodiments, the portable computer device may further comprise instructions configured to prevent overfilling, underfilling, and the discharge of refrigerant into a defective or leaking vehicle coolant system comprise instructions to detect insufficient or a reversal of cooling during a refrigerant fill process based on the received temperature information.

In a fourth aspect, there is a computer-implemented method for servicing a vehicle coolant system, the method comprising: receiving temperature sensor information from a temperature sensor transmitting temperature sensor information at an output vent of an air conditioning system; determining from the temperature sensor information the change in temperature from a first time interval to a second time interval; and, from the received temperature information, the change in temperature and an elapsed time at successive time intervals, actuating refrigerant filling based on the received temperature sensor information, thereby causing the recharging of vehicle coolant system while preventing overfilling, underfilling, and the discharge of refrigerant into a defective or leaking vehicle coolant system.

Embodiments of the fourth aspect may include steps for actuating the filling of refrigerant is based on a threshold change in temperature at sample time intervals, steps for actuating the filling of refrigerant is based on detection of a peak change in temperature at one or more sample time intervals, and/or steps for preventing the overfilling, underfilling, and the discharge of refrigerant into a defective or leaking vehicle coolant system based on the change in temperature indicating insufficient cooling or a reversal of cooling during a refrigerant fill process.

In a fifth aspect, there is a refrigerant autofill device for servicing a vehicle coolant system, the device comprising: a housing configured for threaded attachment to the outlet of a bottle of pressurized refrigerant; and within the housing, a motor-driven valve assembly comprising: a motor having a drive shaft, a controller for the motor, a valve body including an inlet bore configured for fluid communication with the outlet of the bottle, an outlet bore configured for fluid communication with the vehicle coolant system, and a central bore in fluid communication with the inlet and outlet bores, a plunger disposed in the central bore, the plunger having a longitudinal axis, and an elongated member on which the plunger is mounted, the elongated member being operatively engaged with the drive shaft to provide linear motion of the plunger along its longitudinal axis between a first position in which the inlet bore is occluded and a second position in which the inlet bore is open.

In some embodiments of the fifth aspect, the plunger and valve body of the autofill device may be configured so that when the plunger is in the first position both the inlet bore and the outlet bore are occluded. In other embodiments, the angles between the central bore, inlet bore and outlet bore may be selected to allow the plunger to occlude both the inlet bore and the outlet bore when the plunger is in the first position. In still further embodiments, the elongated member and valve body may include complementary features preventing rotational movement of the elongated member, and the linear motion of the plunger is provided by engagement of a threaded portion of the elongated member with a threaded portion of the motor drive shaft.

Embodiments of the fifth aspect may further comprise a worm gear disposed at a distal end of the motor shaft, wherein linear motion of the plunger is provided by engagement of a threaded portion of the elongated member with teeth of the worm gear. In further embodiments of the autofill device, linear motion of the plunger may be provided by a camming action between the motor shaft and the elongated member and/or the pitch of the threaded portions may be selected to allow the plunger to be positioned to only partially occlude the inlet bore. In still further embodiments, the drive shaft of the motor and the elongated member may be coaxially arranged. In other embodiments, the drive shaft of the motor may be disposed at an angle to a longitudinal axis of the elongated member. Embodiments of the fifth aspect may also include a controller configured to adjust the speed and direction of the motor.

In a sixth aspect, there is an autofill device for servicing a vehicle coolant system, the autofill device in fluid communication with the vehicle coolant system and a refrigerant source, the autofill device comprising a refrigerant fill valve; a motor controller unit (MCU) in communication with the refrigerant fill valve; a processor and a memory configured to store instructions for execution by the processor, the instructions when executed by the processor configured to cause the processor to receive temperature sensor information from a temperature sensor transmitting temperature sensor information at an output vent of an air conditioning system, determine from the temperature sensor information the change in temperature from a first time interval to a second time interval, and, from the received temperature information, the change in temperature and an elapsed time at successive time intervals, then actuate the refrigerant fill valve via the motor controller unit based on the received temperature sensor information, thereby causing the recharging of the vehicle coolant system while preventing overfilling, underfilling, and the discharge of refrigerant into a defective or leaking vehicle coolant system.

In some embodiments of the sixth aspect, the autofill device may further comprise instructions implementing a Boolean conditional logic controller for actuating the refrigerant fill valve via the motor controller based on the received temperature sensor information. The Boolean conditional logic controller may further comprise instructions for controlling a Boolean logic state machine implementing fill logic to prevent overfilling, underfilling, and the discharge of refrigerant into an open or leaking vehicle coolant system.

In other embodiments of the autofill device may further include instructions configured to actuate the refrigerant fill valve via the autofill device based on the received temperature sensor information, comprise instructions to actuate the refrigerant fill valve based on the change in temperature at a current time interval to the temperature at a previous time interval. Still further, the autofill device may actuate the refrigerant fill valve via the autofill device based on a threshold change in temperature at sample time intervals, or based on detection of a peak change in temperature at one or more sample time intervals, or based on detection of a peak change in temperature, thereby preventing overfilling, underfilling, and the discharge of refrigerant into a defective or leaking vehicle coolant system by detecting insufficient cooling or a reversal of cooling during a refrigerant fill process based on the received temperature information.

These and other aspects and embodiments of the invention are further described below with reference to the following figures.

BRIEF DESCRIPTION OF THE DRAWINGS

FIG. 4C-C shows a sectional view of the assembled autofill device shown in FIG. 4C taken along section line C-C.

FIG. 12A is table of inputs, outputs, register values, messages, states and actions of an example of temperature cooling during recharging, according to one embodiment of the air conditioning autofill overfill protection temperature sensing air conditioning coolant recharge device; FIG. 12B is a continuation of the table of FIG. 12A.

FIG. 13A is table of inputs, outputs, register values, messages, states and actions of an example of temperature cooling during recharging when a system fault is detected part way through the filling operation; FIG. 13B is a continuation of the table of FIG. 13A.

Figure 1:
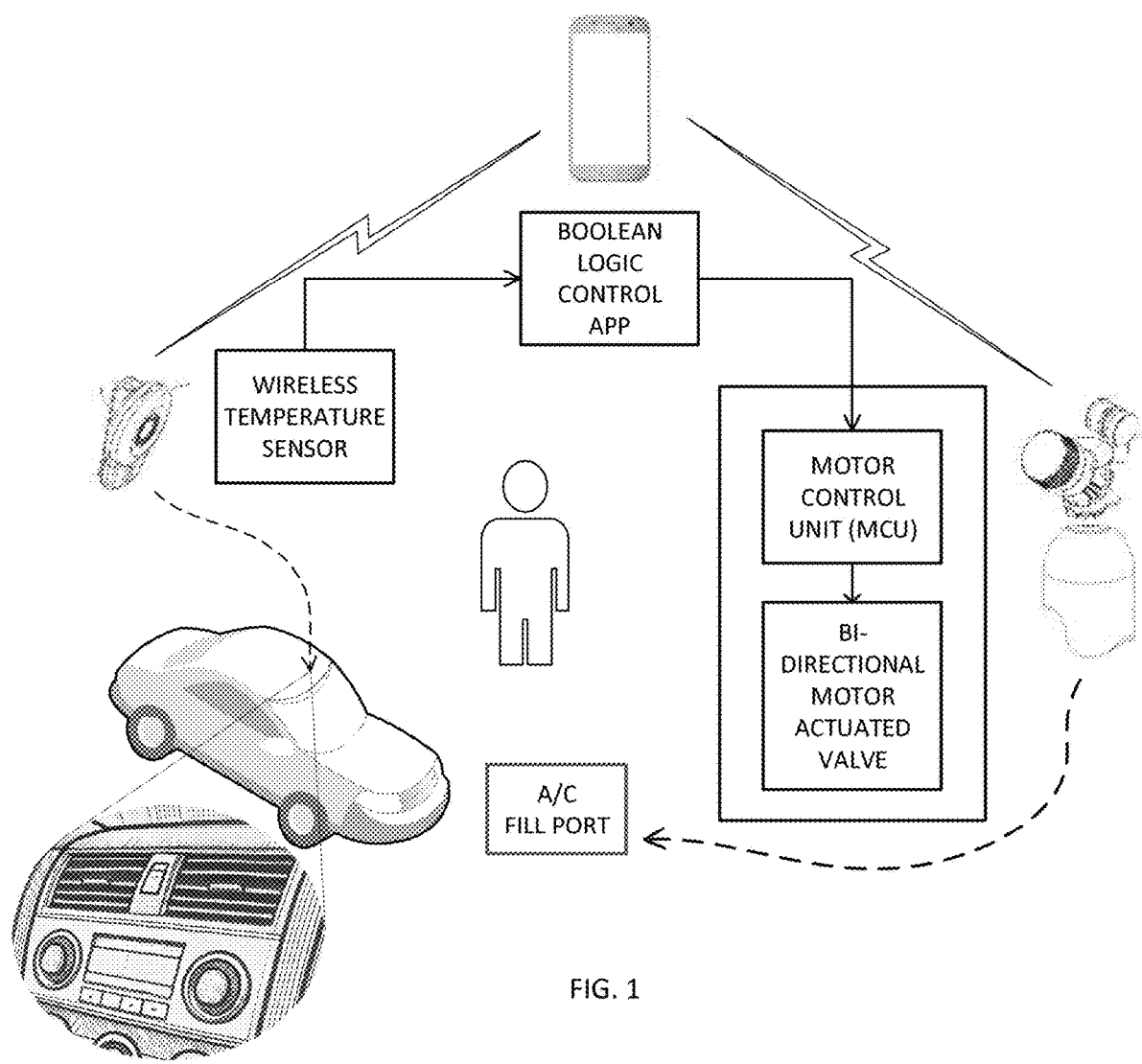
FIG. 1 depicts a system view of the air conditioning autofill overfill protection temperature sensing air conditioning coolant recharge device according to embodiments described herein.

A detailed description will now be given of the invention with reference to the above summarized drawings.

DETAILED DESCRIPTION

While the inventions disclosed herein are susceptible to various modifications and alternative forms, specific embodiments are shown by way of examples in the figures and as described in detail below. It should be understood that the figures and detailed descriptions discussed herein are not intended to limit the invention to the particular forms disclosed. On the contrary, the intention is to cover all modifications, equivalents and alternatives falling within the spirit and scope of the present inventions as defined by the appended claims.

In general, methods and apparatus of the present invention apply sensors, computer and circuit devices, logic control modules, communications interfaces, and actuators to achieve air conditioning autofill with overfill and underfill protection while detecting system failures that would otherwise cause insufficient cooling and leaks of refrigerant into the atmosphere. For example, automated filling according to methods, systems and apparatus of the invention disclosed herein prevent users from emptying an entire can of refrigerant into an air-conditioning system where the A/C system does not require a recharge or cannot accept or hold additional refrigerant. Leaks in the A/C system lines and couplings may expel refrigerant or fail to maintain sufficient pressure to allow for comfort in the air conditioned cabin. Automated filling can prevent the recharging of A/C systems with failed components, such as a broken compressor.

Additionally, changes in A/C system technology, different A/C systems depending on vehicle make and model, geographic location and respective ambient temperature also confound a user-controlled recharging process. For example, higher ambient temperatures cause higher pressures on the low pressure side of an A/C system. Conversely, the cooler the ambient temperature, the lower the initial pressure reading. Such variations would otherwise require the user (if filling using a gauge or filling based on a static ambient temperature) to adjust his or her reading as the user fills the A/C system with conventional recharging systems. In such conditions, user-controlled recharging based on pressure or static temperature differentials typically cause users to overfill or underfill the A/C system under recharge. Failure to adjust for current ambient temperature and its related effect on the pressure readings causes inaccurate refrigerant fill (too much or too little) resulting in decreased A/C system performance or outright failure of the A/C system.

In exemplary embodiments of the present invention the sensors, computer and circuit devices, logic control modules, communications interfaces, and actuators may include: a communications interface between a smartphone application and fill rate control logic modules; a remote mounted temperature sensor; a smartphone application implementing a Boolean logic state machine, and a bi-directional motor controller actuating a plunger valve operable to automatically control refrigerant flow from a standard A/C coolant refrigerant canister. The interfaces among and between the components follow standard communication protocols enabled by smartphone application software to monitor and control refrigerant fill rate based on temperature sensor information transmitted by the remote temperature sensor mounted on an air conditioning vent within the A/C system under filling or recharging.

During operation, as the refilling or recharging of coolant proceeds under the automated control of the methods, apparatus and systems of the present invention, smartphone device may display the reduction of the temperature at the air conditioning vent inside the vehicle based on the addition of refrigerant controlled by a dc motor actuated fill valve and refrigerant bottle assembly. Additionally, the smartphone device may display instructions, controls, parameter settings, and error messages for user control and monitoring of the refrigerant filling. Methods and apparatus of the present invention may determine system integrity using (a) temperature, (b) time, (c) first derivative rates of change in temperature, under (d) the slowing or diminishing of the change in temperature value over the defined time interval. The system control logic that governs the introduction of a refrigerant into the A/C system is distributed across five (5) primary logic modules and a Java-based Boolean conditional logic. The primary logic modules of some embodiments may include Bluetooth Low Energy (BLE) radios and a digital instruction set for communication between a smart device application and a low voltage DC motor controller; a BLE enabled, IC controlled, printed circuit assembly; a low voltage DC motor control module; a low voltage DC motor and mechanical gearing to open a close a plunger valve in a pressurized canister; a Bluetooth Low Energy (BLE) radio broadcast temperature sensor; and a smart device application to process interactive conditional logic commands to control the filling of refrigerant into the fill port of an air conditioning system.

FIG. 1 depicts a system view of the air conditioning autofill overfill protection temperature sensing air conditioning coolant recharge device according to embodiments described herein. As depicted in FIG. 1, there is a vehicle having an air conditioning (A/C) system within (not shown) for which recharging of the A/C system is needed. The exemplary system includes a wireless temperature sensor, a smartphone, and an autofill device, each as further described in detail below. The autofill device as shown is configured for attachment to a refrigerant bottle having a hose (not shown) for attachment to the fill port of the A/C system.

In the exemplary embodiment, the wireless temperature sensor may be a thermocouple thermometer with wireless data communication capabilities, such as, but not limited to RFID, WiFi, IoT/5G, and Bluetooth standards, and broadcasts wirelessly in the vicinity of a vehicle A/C system under recharging. For longer battery life, the temperature sensor may use the Bluetooth Low Energy (BLE) wireless communication standard for broadcasting temperature sensor information to BLE-compatible receiver, however, any suitable wireless data communication standard may be employed. The temperature sensor may include a clip that is configured to allow attachment to one or more air direction fins of the air conditioning vent in the interior of the vehicle being recharged. Such clips may be configured to hold the sensor securely in place on the air conditioning vent while a user is outside of the vehicle or making fill canister connections under the hood of the vehicle. Alternatively, wireless temperature sensor may be substituted by a wired temperature sensor without departing from the scope of some aspects of the invention described herein. In such alternative embodiments, the wired temperature sensor may include an optional clip attachment to an air conditioning vent and/or a container for storage of the wired connection.

The wireless temperature sensor is preferably attached at an A/C output vent inside the vehicle. Typical vehicles have lower and upper air conditioning vents on both the driver and passenger sides in the front cabin of the vehicle. Additionally, air conditioning vents may be located near the front windshield for defrosting windows. In some vehicles, additional air conditioning vents are located in the rear cabin of the vehicle for passengers sitting in the rear seat. In the exemplary embodiment, the temperature sensor (e.g., in the form of the wireless temperature sensor 44 as shown in FIG. 1 and FIG. 5D) is used to measure the temperature of the air output from the upper air conditioning vent in the front cabin. It is noted that wireless temperature sensor may also be used at a different air conditioning output vent in the vehicle without departing from the scope or operation of the invention as described herein.

Additionally, wireless temperature sensor may optionally include an activation control, e.g. a button or switch, and/or a timer adapted for turning off the power of the temperature sensor after a determined time period of activation, thereby conserving battery power. When activated, in some embodiments, temperature information is transmitted from the wireless temperature sensor periodically by wireless communications. Temperature information may be received by a wireless receiver on a smartphone device. Temperature information received from the smartphone device may recorded, displayed, analyzed, and used by a smartphone application operating on the smartphone device to control recharging by the autofill device. In operation, when activated, wireless temperature sensor may transmit, by wired or wireless communications as above, updates of the temperature information at an output air conditioning vent inside the vehicle. In various embodiments, wireless temperature sensor may provide updates in real-time, at predetermined intervals, or upon request by the user or by an input control on the wireless temperature sensor. Alternatively, in some embodiments, temperature sensor may be polled by the smartphone device or other control device for an instantaneous reading of temperature at the air conditioning vent.

FIG. 1 further depicts a smartphone device in communication with the wireless temperature sensor and further in communication with the motor control unit (MCU). Smartphone device as used herein includes any computer device, preferably a portable computer device, capable of configuration, programming, and operation according to the methods described herein. Such smartphones may include, but are not limited to, the Apple™ iPhone, Android-enabled smartphones and devices, Blackberry™ or other personal digital assistant devices, tablet PC's such as the Apple™ iPad, Samsung™ Galaxy Tab and other such devices as one of ordinary skill in the art would readily understand as equivalents. Such devices may include two-way communications via cellular network communications and/or an internet communications path via WiFi, WLAN, or other TCP/IP communications means for application software and data updates, or for the uploading or sharing of application data to the cloud.

Operation of the components of the exemplary system as shown in FIG. 1 are further described below with reference to a standard model of an evaporator cycle of a typical A/C system, the operation of which as would be understood to one skilled in the art as follows with reference to FIG. 2.

Figure 2:
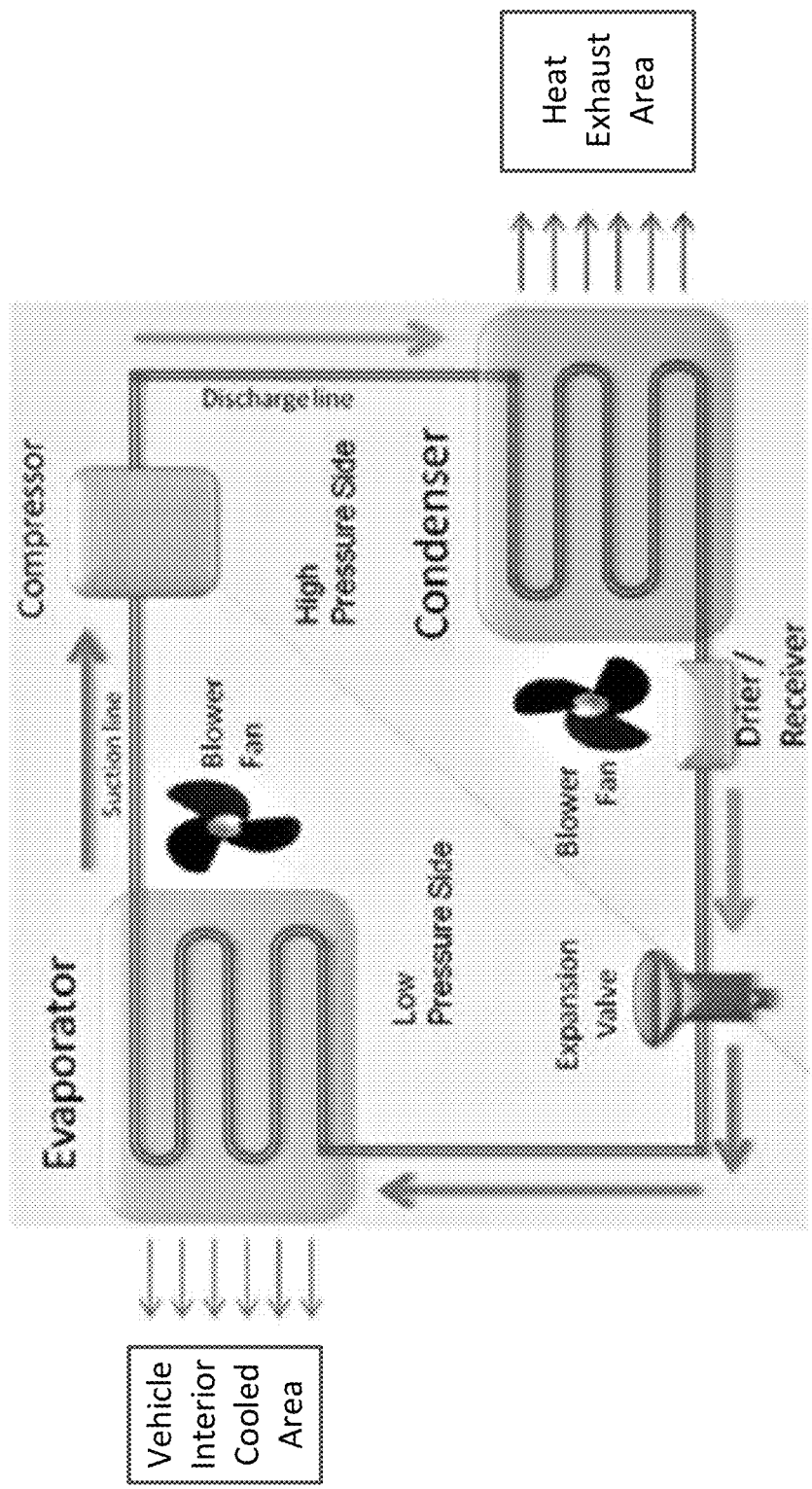
FIG. 2 depicts the evaporator cycle of a typical air conditioning system for application of the air conditioning autofill overfill protection temperature sensing air conditioning coolant recharge device described herein.

FIG. 2 depicts the evaporator cycle of a typical air conditioning system for application of the air conditioning autofill overfill protection temperature sensing air conditioning coolant recharge device described herein. The typical air conditioning system as shown in FIG. 1 comprises a low pressure side having an evaporator, a high pressure side having a condenser and a drier/receiver, and at the boundaries of the low and high pressure sides, an expansion valve and a compressor. The high and low pressure sides of the air conditioning system operate to provide thermal exchange between an environmentally contained "cooled" space and a heat discharge space. Such air conditioning systems may include a low pressure side blower fan for blowing air across the evaporator coil and a high pressure side blower fan for blowing air across the condenser coil evaporator to accelerate the thermal exchange between the environmentally contained space and the heat discharge space, respectively. Typically, the low pressure side includes a fill port (not shown) providing a bayonet/spring sealed connection to a fill nozzle.

Within the coils of FIG. 2 is a refrigerant, typically 1,1,1,2-tetrafluoroethane (also known as R134a, Freon 134a, Forane 134a, Genetron 134a, Florasol 134a, Suva 134a, norflurane (INN), or HFC-134a). 1,1,1,2-Tetrafluoroethane or R134a is a non-flammable gas used primarily as a high-temperature refrigerant for domestic refrigeration and automobile air conditioners. R134a began use in the early 1990s as a replacement for the more environmentally harmful R12. R134a is a hydrofluorocarbon (HFC) and haloalkane refrigerant with thermodynamic properties similar to R12 (dichlorodifluoromethane) but with insignificant ozone depletion potential and a lower 100-year global warming potential. Despite its lessor ozone depletion and lessor global warming potential, atmospheric concentrations of R134a refrigerants have been increasing. R134a contributions to radiative forcing has led to restrictions on its use and discharge. By 2030, for example, R134a will be banned from use in automotive air conditioning systems in the European Union, and by 2021 in the United States for newly manufactured light-duty vehicles. Nonetheless, beyond the bans and because air conditioning systems of presently manufactured vehicles are designed for use with R134a only, recharging systems must accommodate ever more stringent controls on R143A recharging. Beyond the bans and for newly manufactured vehicles, because substitutes for R134a are less efficient at cooling (for example, the fluorochemical refrigerant HFO-1234yf 2,3,3,3-tetrafluoropropene, or R-1234yf), the efficiency and effectiveness of air conditioning systems calls for even more precision in their recharging.

Cycling the system shown in FIG. 2 by the compressor sets up a high to low pressure, high to low temperature exchange that captures excess heat in a liquid phase refrigerant and rapidly expands the refrigerant on the low pressure side, lowering the refrigerant temperature through the evaporator coil. Latent heat fusion condenses the refrigerant to capture heat from an environmentally contained space and the condenser blow fan discharges heat into the heat discharge space. Beginning the cycle, the compressor compresses refrigerant drawn from the low pressure side suction line into the high pressure side discharge line of the coil. At the output of the condenser the drier/receiver serves as temporary storage for refrigerant during periods of low cooling demand and may contain a desiccant for reduction of moisture within the coil, High pressure refrigerant exits through the expansion valve into the low pressure side thus cooling the low pressure side coil. The low pressure side blower fan blows air across the evaporator coil into the environmentally contained space to complete the cycle.

To properly cool the air as it is blown through the evaporator coil, the high side pressure and the low side pressure differential must be sufficient enough to cause the desired cooling effect. If there is too little refrigerant in the A/C system, then the high side pressure is insufficiently high and thus the differential between the high side pressure and low side pressure is not sufficient to create a cooling effect. If there is too much refrigerant, the high side pressure is over charged and the low side pressure becomes relatively too high as well. That is, where the differential between the high pressure and low pressure is not sufficiently high, the low side pressure increases as well resulting in the compressor pumping liquid refrigerant, not in gas form, through the evaporator coil and causing possible damage to A/C system components.

One skilled in the art would understand that the physical integrity of the liquid-to-vapor phase change cycle maintains the refrigerant in the system. If the physical integrity of the air conditioning system is compromised the refrigerant will leak out and the pressure differential between the high and low side cannot be maintained. When the integrity of the system is comprised, the cooling capacity of the system is lost and thus the A/C system's ability to control temperature in the environmentally contained space is compromised. The loss of system integrity is environmentally unfavorable as R134a is a greenhouse gas in the upper atmosphere contributing to retention of heat in the Earth's climate with corresponding impacts to global warning. One skilled in the art would understand that excess charging of an A/C system not only results in failure or poor performance of the A/C system, excess charging wastes a greenhouse-gas contributing refrigerant that will eventually find its way to the upper atmosphere.

Figure 3:
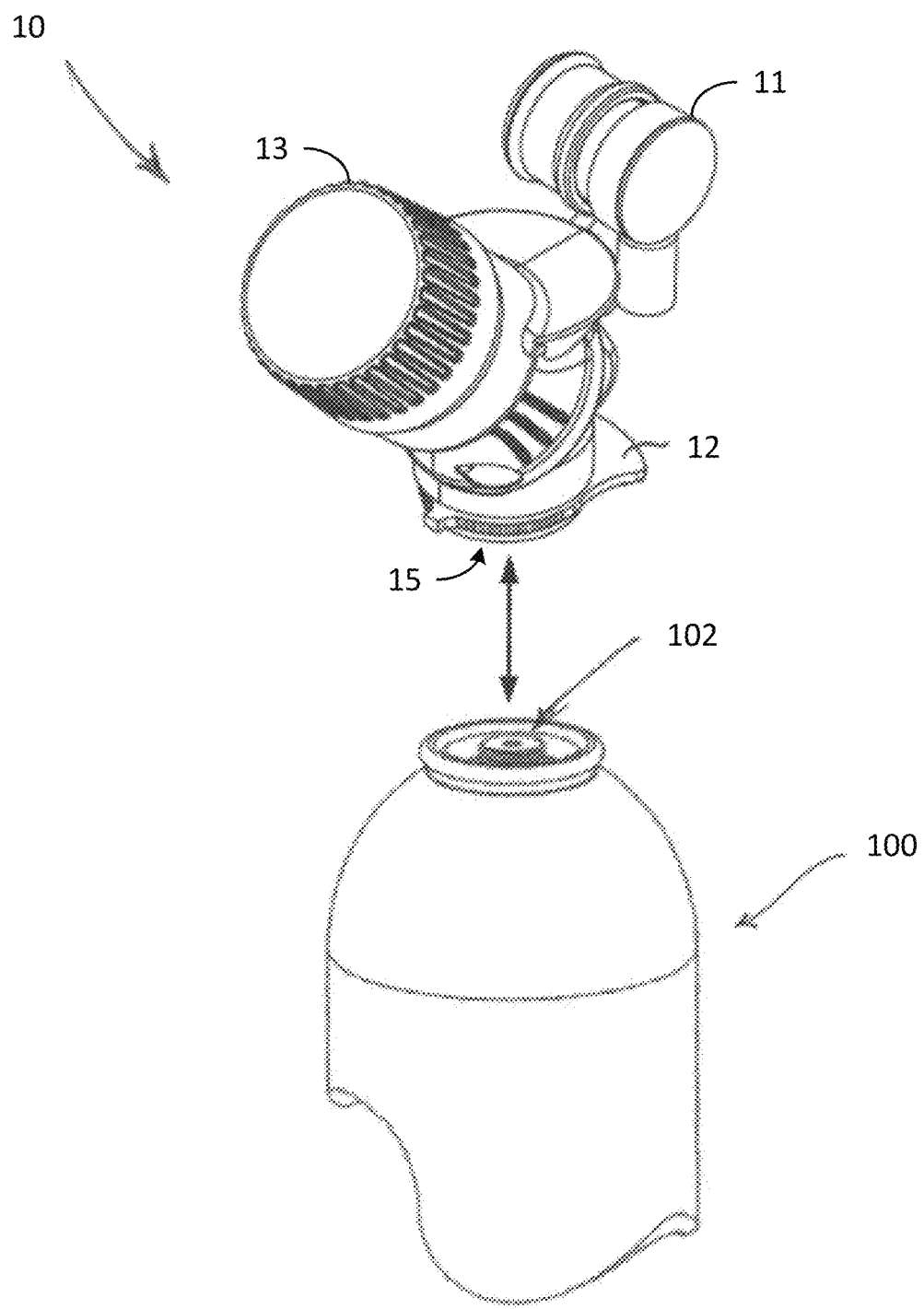
FIG. 3 depicts an exemplary air conditioning refrigerant bottle and autofill device for engagement with the air conditioning refrigerant bottle for use with some embodiments of the invention.

FIG. 3 depicts an exemplary autofill device 10 for engagement with an air conditioning refrigerant bottle 100 according to some embodiments of the invention. As shown in FIG. 3, the autofill device 10 is configured for threaded attachment to a corresponding portion 102 of a pressurized refrigerant bottle 100, and includes an attachment portion 15 (best shown in FIG. 4D) that is adapted to allow easy removal of the autofill device from the bottle. Bottle connector 12 may be adapted for attachment to attachment portion 15 for use in shipping so as the refrigerant can is not accidentally open during shipping, storage and sale because the attachment portion 15, once screwed on to refrigerant bottle opens the port of the bottle. Autofill device also includes a quick detach coupler 11 for attaching to a vehicle air conditioning port and top cap assembly 13. The autofill device includes an actuation device, as further detailed below, such that when the autofill device is actuated to an open position, refrigerant flows from the refrigerant bottle into the A/C system, thereby refilling or recharging the coolant system.

Figure 4:
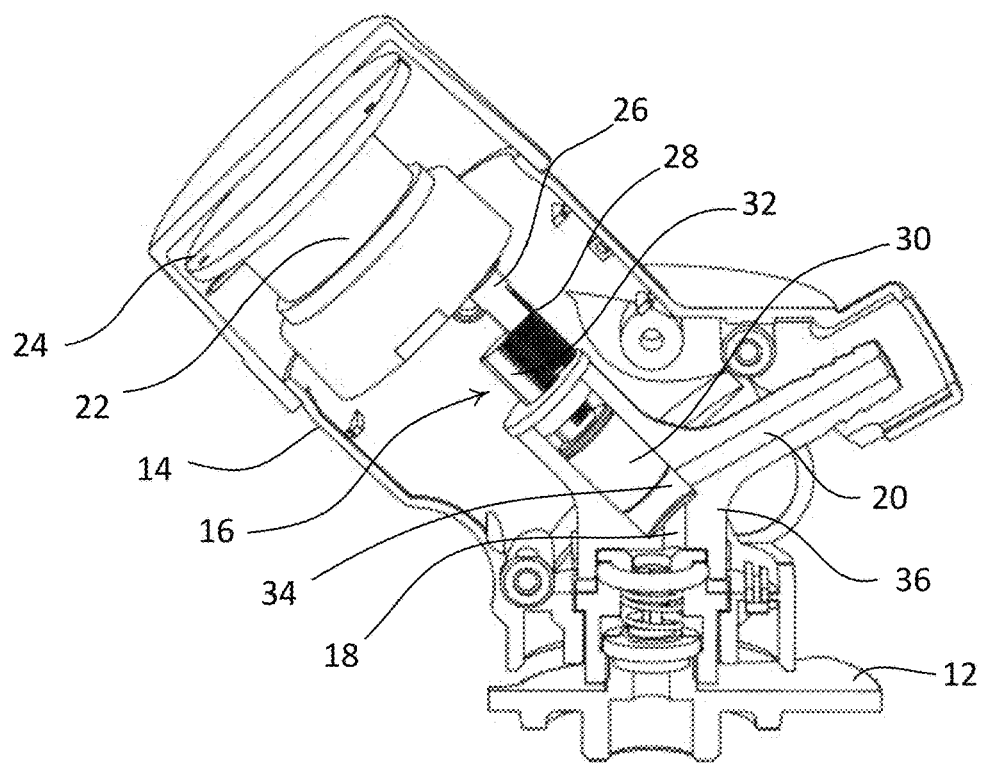
FIGS. 4 and 4A show internal perspective views of an autofill device according to one implementation, showing the plunger of the autofill device in open (4) and closed (4A) positions, respectively.

FIG. 4 shows an autofill device 10 according to one embodiment. The autofill device 10 includes, within a housing 14, a motor-driven valve assembly 16 which controls flow through an inlet bore 18 in communication with the bottle 100 (FIG. 3) and an outlet bore 20 in communication with the A/C system (not shown). In the open position shown in FIG. 4, coolant can flow freely from the inlet to the outlet, while in the closed position shown in FIG. 4A both the inlet and outlet are closed off and flow from the inlet to the outlet is prevented.

Referring again to FIG. 4, the motor-driven valve assembly 16 includes a bidirectional DC motor 22, a controller (motor control unit MCU) 24 for the motor, a motor shaft 26 extending from the motor and having a threaded distal portion 28 (FIG. 4A), and a plunger 30 mounted on the distal end of a threaded rod 32. The plunger is positioned in a bore 34 of a valve body 36 which also includes the inlet bore 18 and outlet bore 20 referred to above. The plunger and valve body are configured so that when it is in the closed position shown in FIG. 4A a bottom surface of the plunger occludes the opening of the inlet bore, while a side surface of the plunger occludes the opening of the outlet bore. In addition to the dimensions of the plunger, this is accomplished by the arrangement of the three bores in the valve body (bore 34, inlet bore 18 and outlet bore 20). In preferred embodiments, the included angle between bore 34 and outlet bore 20 is from about 100 and 110 degrees, the included angle between bore 34 and inlet bore 18 is from about 135 and 145 degrees, and the included angle between the inlet bore 18 and the outlet bore 20 is from about 115 to 125 degrees. Because the plunger occludes both openings when the valve is closed, refrigerant can neither flow into the autofill device from the refrigerant bottle (the normal direction of flow) nor from the A/C system (backflow).

Figure 4A:
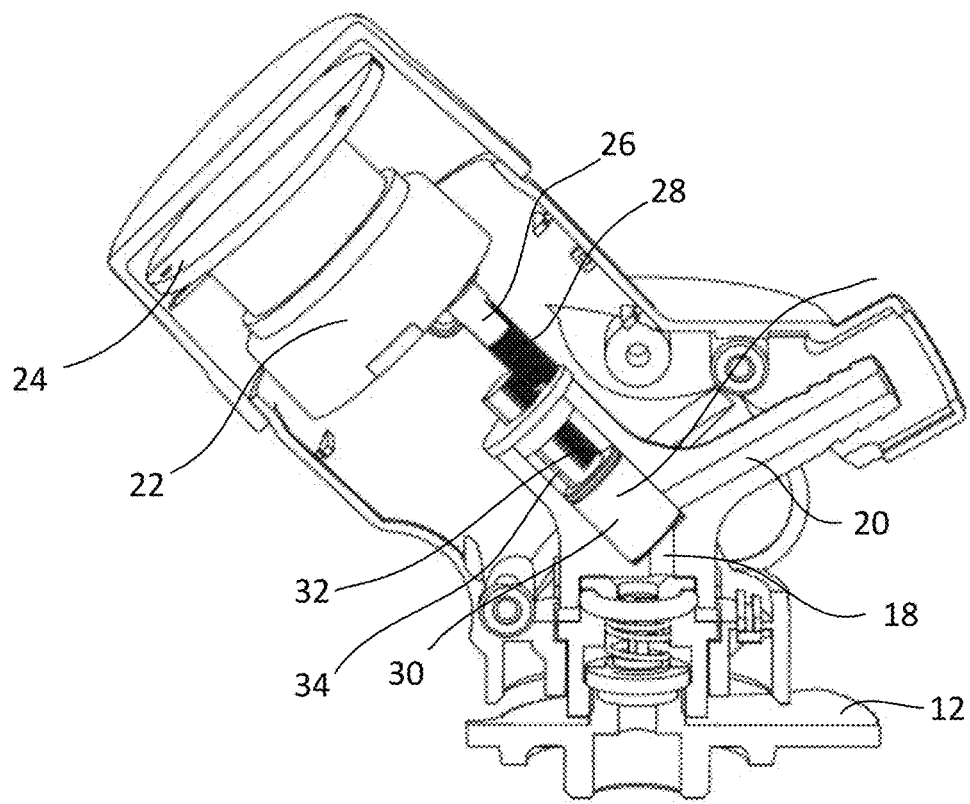

In the embodiment shown in FIGS. 4 and 4A, linear movement of the plunger is controlled by engagement of the threads of threaded rod 32 with those of the threaded distal portion 28 of the motor shaft 26. Rotational movement of the threaded rod 32 is prevented by engagement of keyed features on the threaded rod 32 and the adjacent inner wall of the bore 34 which are configured to allow linear motion but prevent rotational movement. Accordingly, as the motor shaft 26 rotates, engagement of the threads causes the threaded rod, and thus the plunger, to move along the longitudinal axis of the rod/plunger assembly. The direction of movement is determined by the direction of the bidirectional motor, allowing back and forth movement. Depending on the thread pitch used, the autofill device can be configured so that the valve can be partially open, as well as fully open or closed. This can allow the flow rate of refrigerant through the autofill device, and thus fill rate, to be adjusted by signals from the controller to the motor.

Figure 4B:
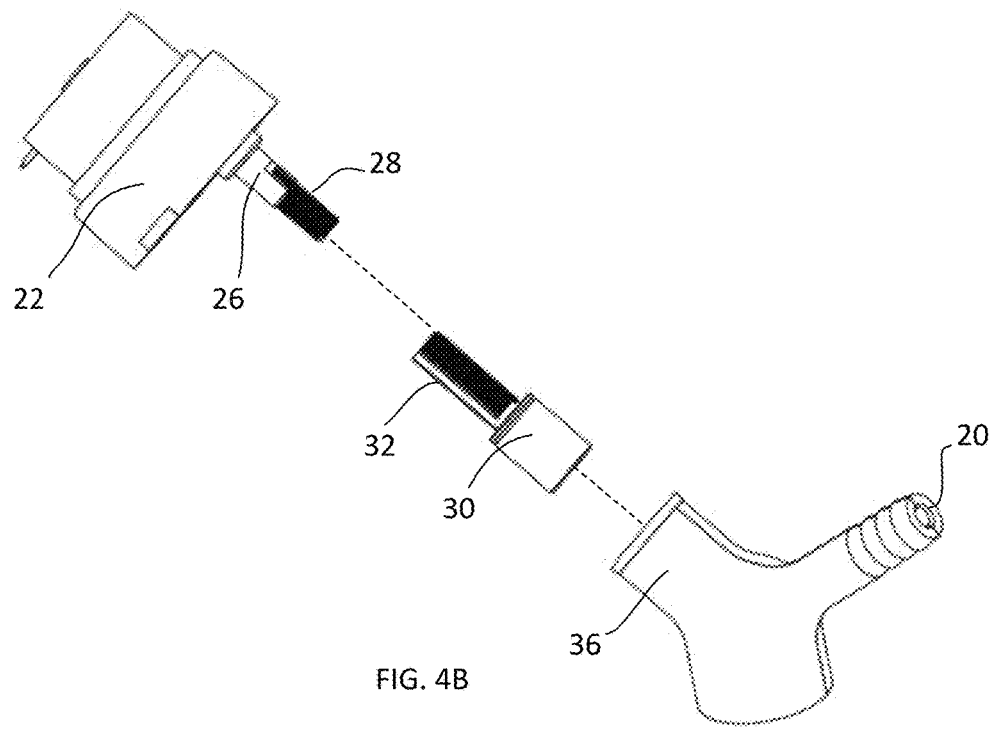
FIG. 4B is an exploded perspective view of the motor controller unit, plunger rod, and fill control portion of the autofill device.
Figure 4C:
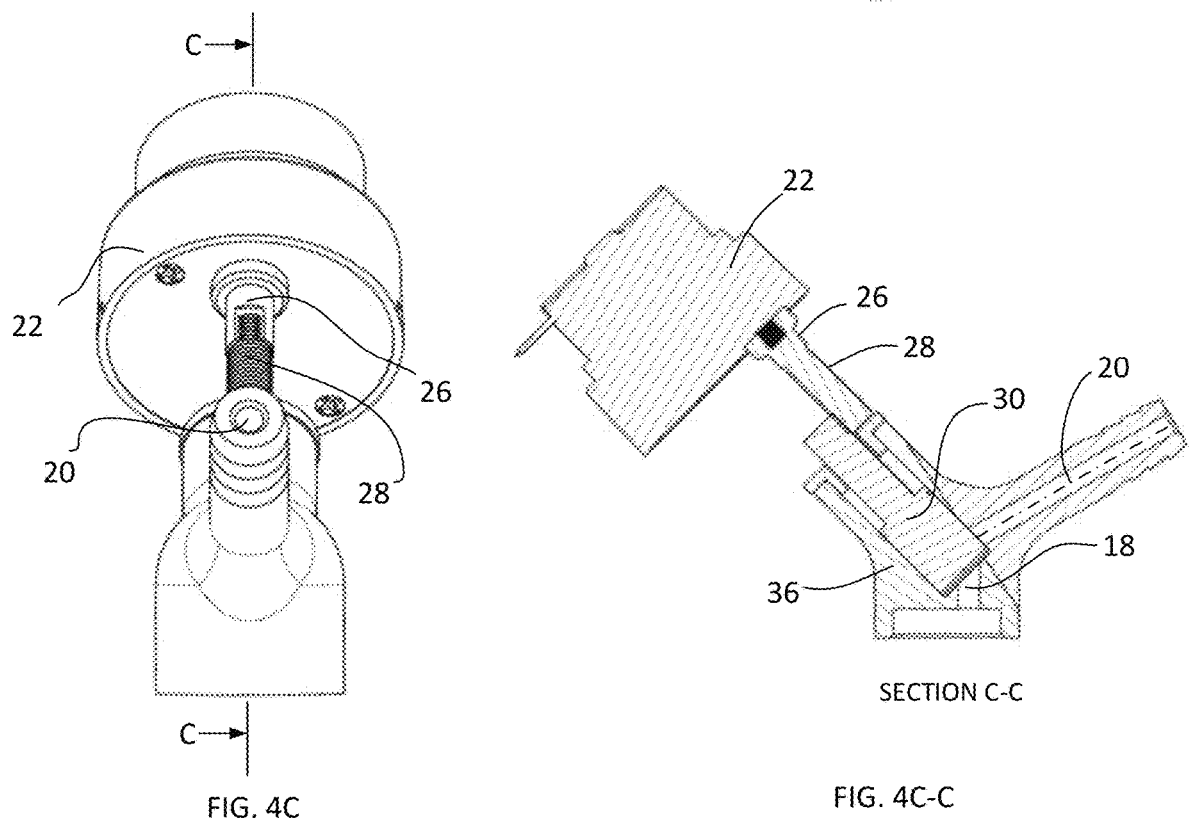
FIG. 4C shows an assembled view of the components of the autofill device shown in FIG. 4B.
Figure 4D:
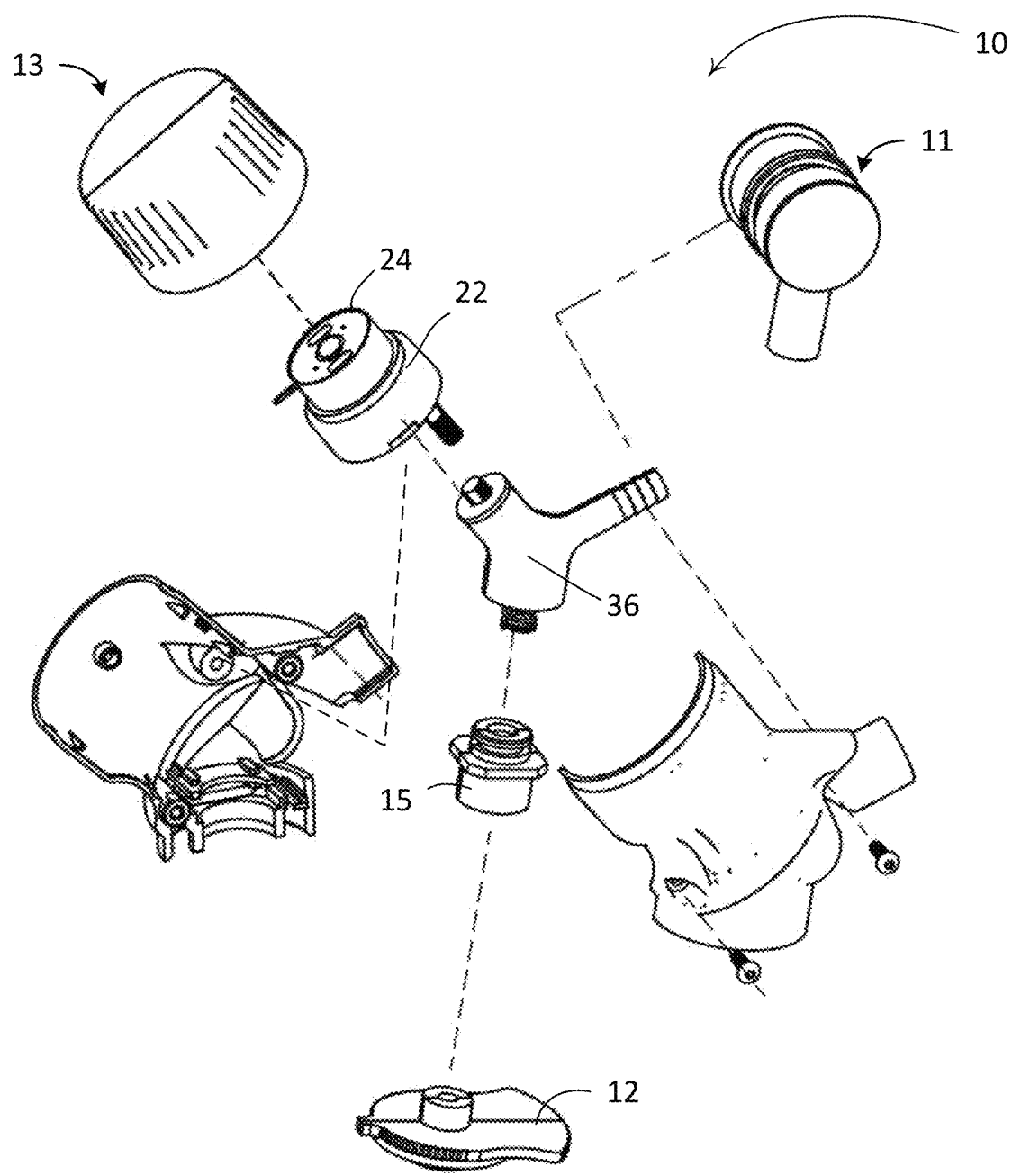
FIG. 4D is an exploded view the autofill device of FIG. 4.

FIGS. 4B, 4C, 4C-C, and 4D show various views of the autofill device with reference to the descriptions above as to FIGS. 4 and 4A. FIG. 4B is an exploded perspective view of the motor controller unit, plunger rod, and fill control portion of the autofill device. FIG. 4C shows an assembled view of the components of the autofill device shown in FIG. 4B. FIG. 4C-C shows a sectional view of the assembled autofill device shown in FIG. 4C taken along section line C-C. FIG. 4D is an exploded view the autofill device of FIG. 4.

Figure 4E:
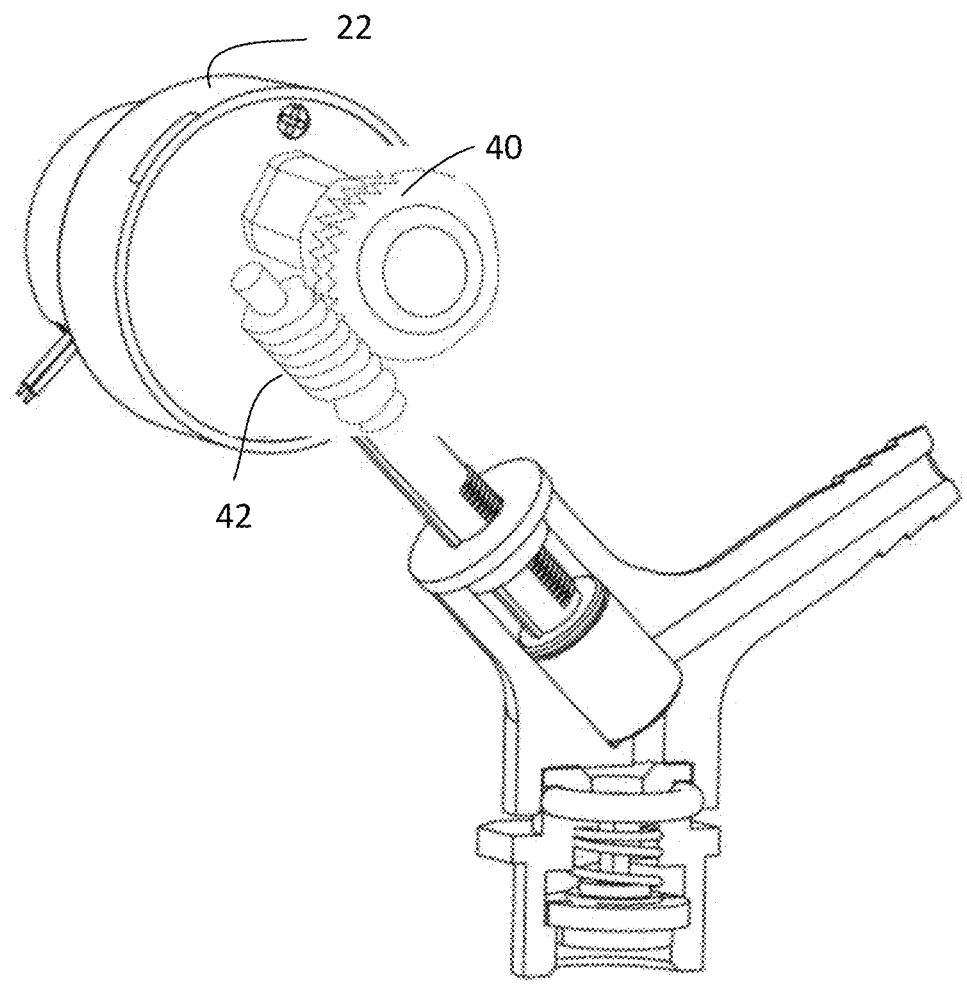
FIG. 4E shows a diagrammatic view of an autofill device according to an alternate embodiment.

A number of different types of drive mechanisms can be used to move the plunger between its open and closed positions, as will be appreciated by those of skill in the art. For example, movement can be accomplished using a variety of camming arrangements and other techniques for converting rotational movement to axial movement. An example of an alternative system is shown in FIG. 4E. In the embodiment shown in this figure, the threaded portion of the drive shaft is replaced by a worm gear 40, which engages threads 42 to provide linear movement of the plunger. This arrangement allows the motor shaft to be oriented at an angle with respect to the threaded rod, rather than coaxially with it.

It is also noted that in other embodiments the motor-driven valve assembly can be configured such that the plunger only occludes the inlet bore when in its closed position.

Figure 5A:
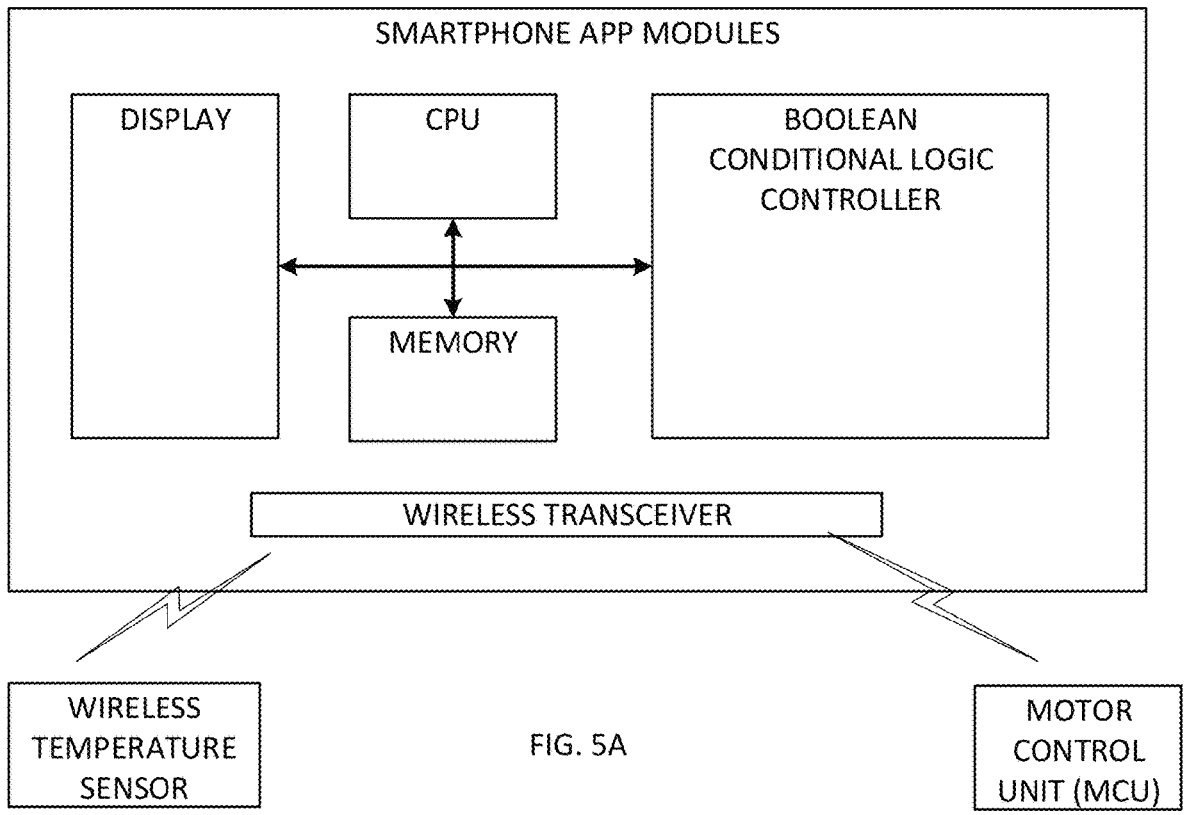
FIGS. 5A and 5B show a component view and a conceptual circuit view, respectively, of the smartphone app modules and the Boolean logic controller, respectively, according to one embodiment of the invention.

FIG. 5A depicts a component view of the smartphone application modules according to one embodiment of the invention. As previously described, smartphone device may be any computer device, preferably a portable computer device, capable of configuration, programming, and operation according to the methods described herein. Smartphone application modules include a display module, a processor (CPU), memory, a data bus, and a wireless transceiver module. Wireless transceiver module may be in wireless communication with the wireless temperature sensor and the motor control unit (MCU) to be further described below. Smartphone application modules further include a Boolean conditional logic controller module for monitoring and executing the Boolean logic refill flow control methods as described herein.

Figure 5B:
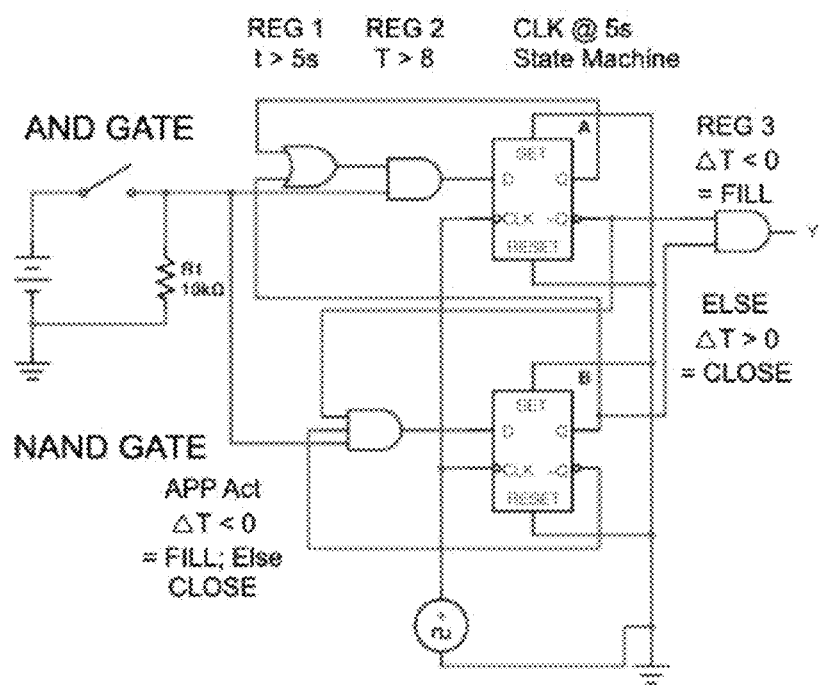

FIG. 5B depicts a conceptual view of a Boolean logic state machine for implementing the Boolean logic flow control methods of the present application. The Boolean logic state machine employs, preferably, three (3) primary registers to monitor and control refrigerant filling as a function of temperature, change in temperature and sample time. The output of the Boolean logic state machine provides for control of the bi-directional motor actuated valve of the motor control unit (MCU) for opening and closing a valve in communication with the refrigerant bottle and the A/C system fill port. NAND gates of the Boolean logic state machine govern the mid-cycle control of refrigerant in the A/C systems the begin cooling but cannot sustain stable temperatures, which may indicate a partial or leaking seal within the A/C system, and causing refrigerant filling to be disabled.

Figure 5C:
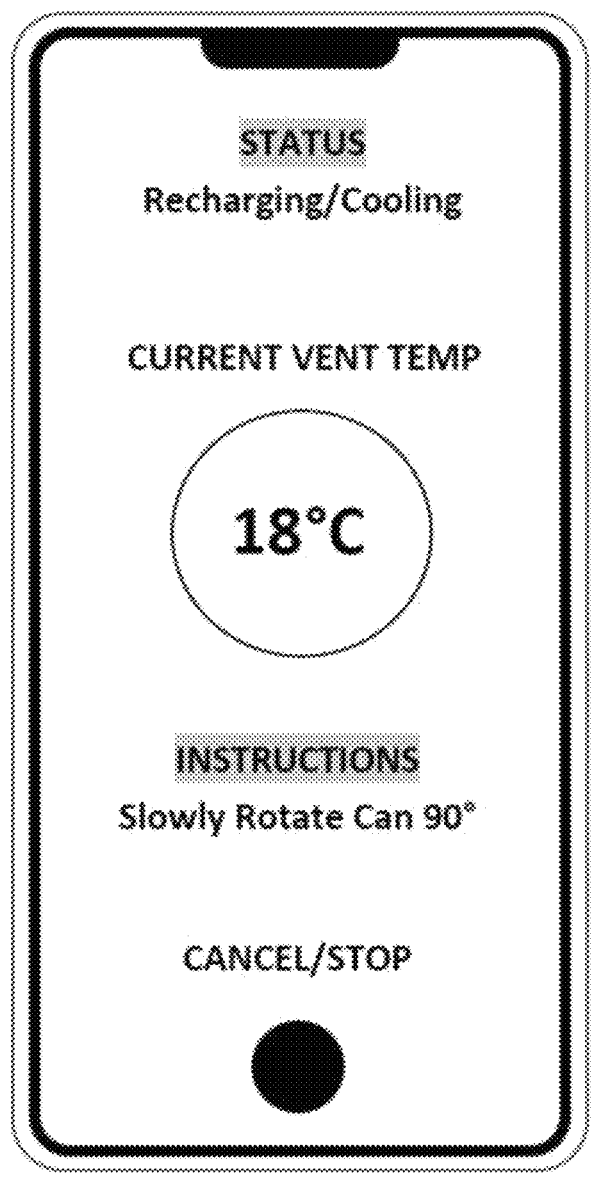
FIG. 5C depicts a user interface of the smartphone app device according to one embodiment of the invention.
Figure 5D:
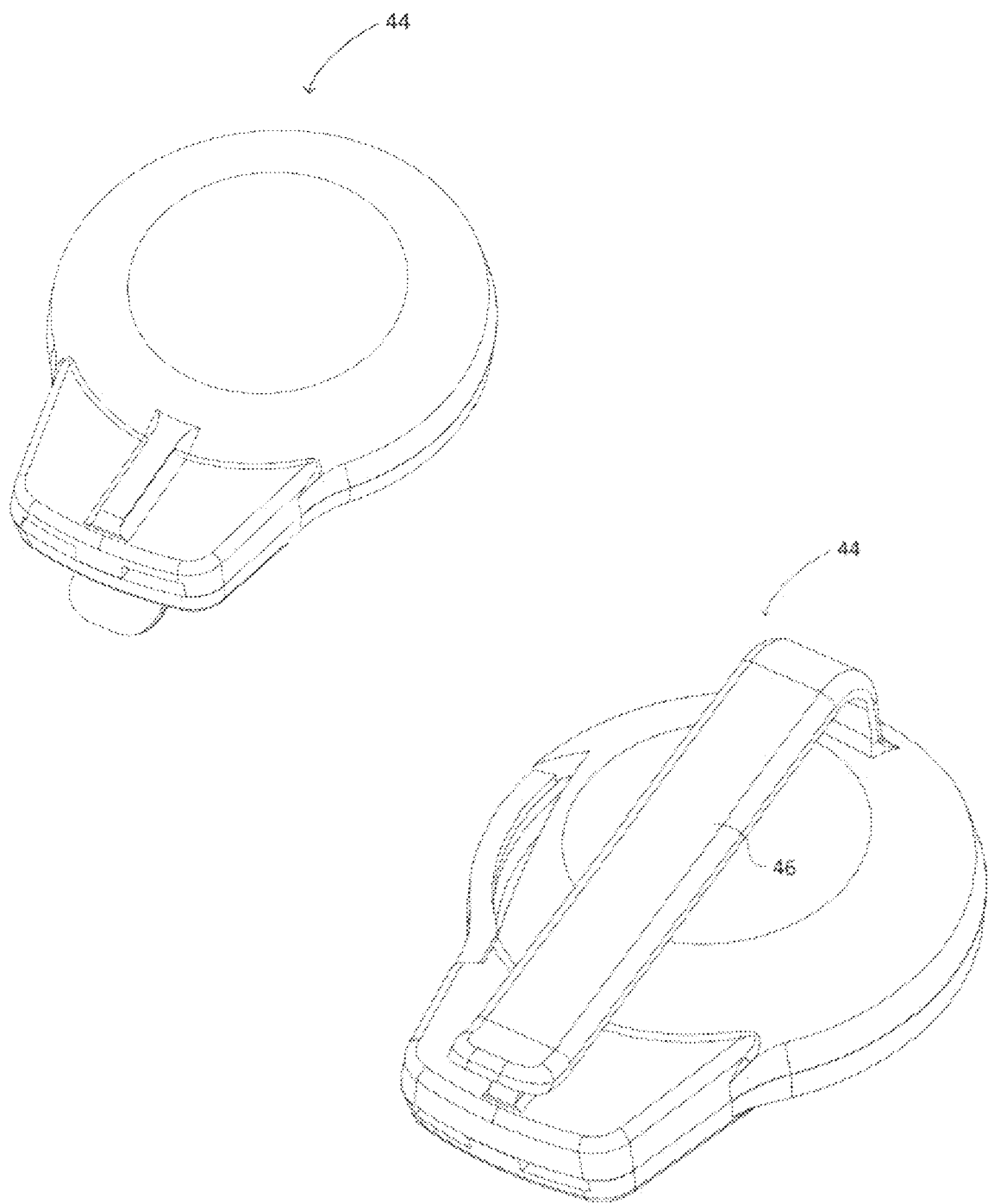
FIG. 5D shows front and back perspective views of a wireless temperature sensor with clip as may be used in some embodiments of the invention.

FIG. 5C depicts an exemplary user interface of the smartphone app device according to some embodiments of the invention. As shown, the smartphone app device may present to the user the current sampled temperature at the output vent of the air conditioning system as measured by the temperature sensor. Current temperature may be displayed in Celsius or Fahrenheit according to user settings. Control of the recharging process may be provided by user buttons, menu options, or other control elements, including a Cancel/Stop control to cause refilling to end. Status messages may include, but are not limited to:

System initializing
Ambient within normal fill temperature range
Initialization complete
Refrigerant fill in process
Refrigerant fill rate slowing
Refrigerant fill rate slowing % complete
Refrigerant fill complete Vent temp reduced
A/C performance stable
A/C performance stable
Status messages may include instructions to the user such as:
Please disconnect the fill hose coupling from the refrigerant inlet connector
Please reclaim the temp sensor from the A/C vent and turn off
Congratulations! A/C project complete!
The user interface may include status messages for input of feedback from the user such as "Please rate your fill rate experience: ☆ ☆ ☆ ☆ ☆"

Figure 5E:
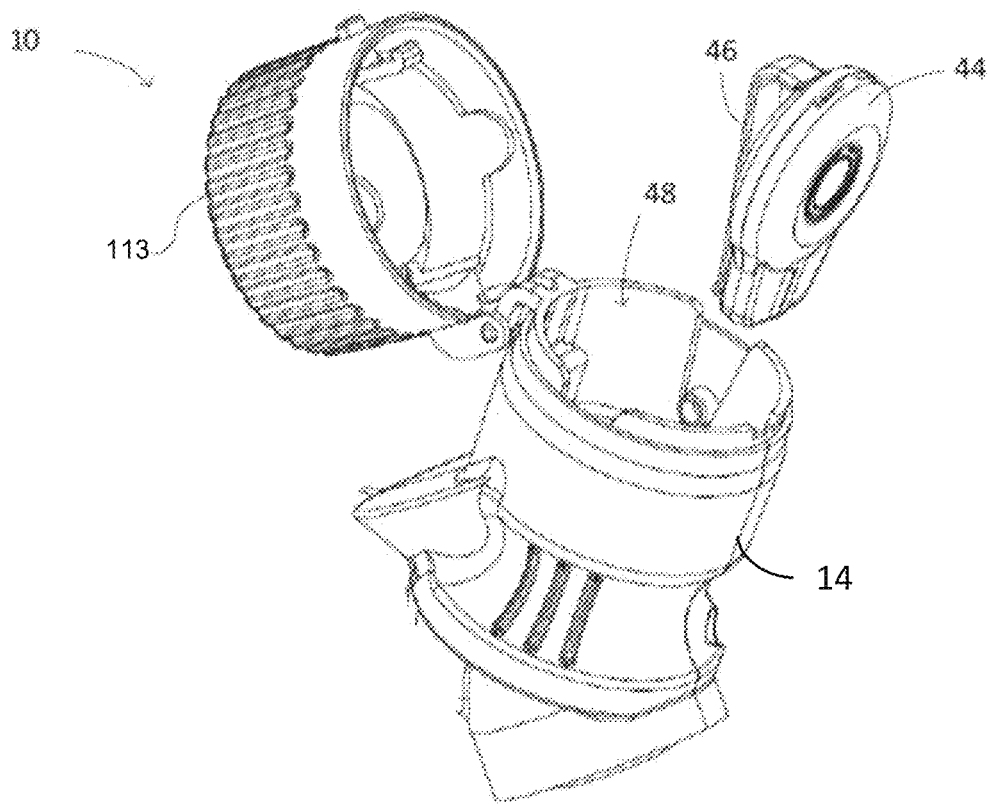
FIG. 5E is a perspective view according to an alternate embodiment having a hinged housing defining a cavity, and includes a wireless sensor stored in the cavity and a display on the face of the housing.

FIG. 5D depict views of a temperature sensor 44 suitable for use with the autofill system. Temperature sensor 44 has wireless data communication capabilities, such as but not limited to RFID, WiFi, IoT/5G, and Bluetooth standards. Temperature sensor 44 may include a clip 46 configured to allow the temperature sensor to be easily attached to an air conditioning vent in the interior of the vehicle being serviced. In some embodiments, as shown in FIG. 5E, the autofill device housing 14 is configured with a flip-up lid 113 for providing access to compartment 48 in which may be stored the wireless temperature sensor 44.

Figure 5F:
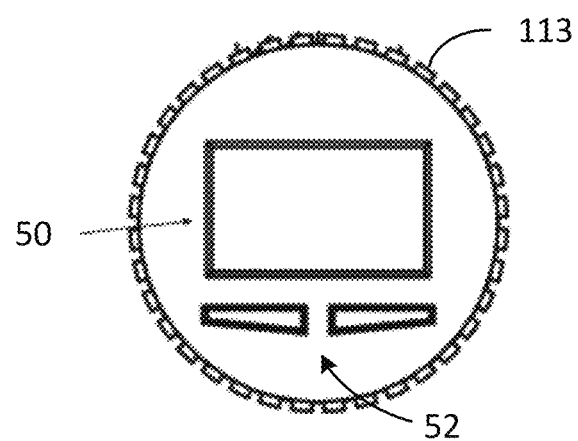
FIG. 5F depicts an alternative embodiment providing display and control button capabilities for user display and control during operation of the autofill device.

In a further alternative embodiment shown in FIG. 5F, flip-up lid 113 may include display and user input components, including an LCD display 50, control buttons 52, and a printed circuit board (pcb) (not shown) housed within the flip-up lid. The printed circuit board may include a processor and a memory for storing data and instructions for performing operations and displays based on temperature data obtained by temperature sensor 44. Instructions performed by the processor may be configured to implement the Boolean logic controller functions as described below, as an alternative to the smartphone hosted application described above. For example, the printed circuit board may be configured to control refrigerant filling via the MCU by implementing the Boolean logic state machine discussed in detail below. Printed circuit board may be based, in some embodiments, on the ARDUINO™ hardware and software system, and may be integrated with, or integrate the functions of the MCU as described herein. Display 50 may be configured to display messages to the user as with the examples given above. Buttons 52 may be configured to interact with the printed circuit board to allow user control of information displayed on the display screen 50 and operations of the logic controller or MCU.

Returning to FIG. 5B, primary registers of the Boolean logic state machine include:
Register 1 (REG1) storing a time in elapsed seconds following an initial temperature reading ($T_{initial}$ or $T_0$);
Register 2 (REG2) storing a sampled temperature reading ($T_{sampled}$); and
Register 3 (REG3) storing a change in temperature ($\Delta T$ or delta T) from the initial temperature $T_{initial}$ and the sampled temperature $T_{sampled}$, or in subsequent time intervals, change in temperature from a previous time interval ($T_1$) from the currently sampled temperature ($T_2$).

CLK of the Boolean logic state machine may be a sample clock interval in units of seconds for advancing the Boolean logic state machine. In the Boolean logic state machine shown in FIG. 5B, the sample time interval is shown as set to five (5) seconds (CLK=5s). However, the sample time interval may vary from one-tenth (0.1) of a second to 10 seconds, or at smaller or larger time intervals without loss of generality as to the methods described herein.

As such, during operation of the Boolean logic state machine, Register 1 stores time in elapsed seconds since an initial temperature sensor reading. Register 2 stores a sampled temperature. This temperature is used as sampled or current temperature in which change in temperature calculations are made. The temperature readings are based on the temperature reading from the wireless temperature sensor. Initially, the previous temperature ($T_1$) and the sampled temperature ($T_2$). or $\Delta T=T_2-T_1$. are the same. In each subsequent time step, the state of Register 2 is the sampled temperature at the current time step, and Register 3 is updated with the change in temperature $\Delta T$ from the temperature at the previous time step. That is, Register 3 stores $\Delta T$ is the difference between a previous temperature and a sampled temperature at the output vent of the A/C system.

It is noted that in implementation, elapsed time, initial temperature, sampled temperature, and change in temperature may be stored by the Boolean logic state machine registers in any digital numeric or binary format without loss of applicability by the particular manner of implementation.

Each of the states of the Boolean logic state machine determine, based on these registers, the refrigerant valve state to be actuated via the motor controller unit (MCU). For example, REG 1, the time in elapsed seconds is used in part to control filling at an Initial state, a Fill Opening state, a Filling state, a Fill Peak state, a Fill Slowing state, a Fill Closing state, and a Fill Complete state. REG 2, the sample temperature is used in part to determine whether the A/C system is in an initial range of acceptable temperatures for proper recharging. REG 3, change in temperature $\Delta T$, serves two main functions in the autofill overprotection automated A/C refill system. In a first function, if the integrity of the refrigerant containment system is compromised, expansion of ambient air will not register a meaningful temperature change. The Boolean logic state machine may identify the loss of system integrity of the refrigerant containment system and thereby cause the motor controller unit (MCU) to close the refrigerant fill valve. In the second main function of ΔT, as cooling efficiency of the A/C system under recharging approaches optimum efficient fill capacity, further filling of refrigerant on the low pressure side of the A/C system will reduce the expansion capacity of the system. Upon reaching optimum efficient fill capacity, the Boolean logic state machine will thereby cause the motor controller unit (MCU) to close the refrigerant fill valve.

Temperature sensor information received from inside the environmentally contained area, e.g. in the interior of an automobile having a wireless temperature sensor clipped to an A/C system output vent), records ambient temperature the start of the system refrigerant integrity assessment. The rate of change in initial temperature sensor readings confirms whether the basic integrity of the systems is sufficient to begin the replenishment of refrigerant. If a phase change is present as the system begins operation (condenser high side pressure to yield a liquid refrigerant to low side expansion to yield a vapor phase refrigerant), there will be a corresponding change in temperature over a known time interval. The temperate change is recorded by proxy in the three registers of the Boolean logic state machine, updated based on a smartphone application software controller sample rate.

Figure 6A:
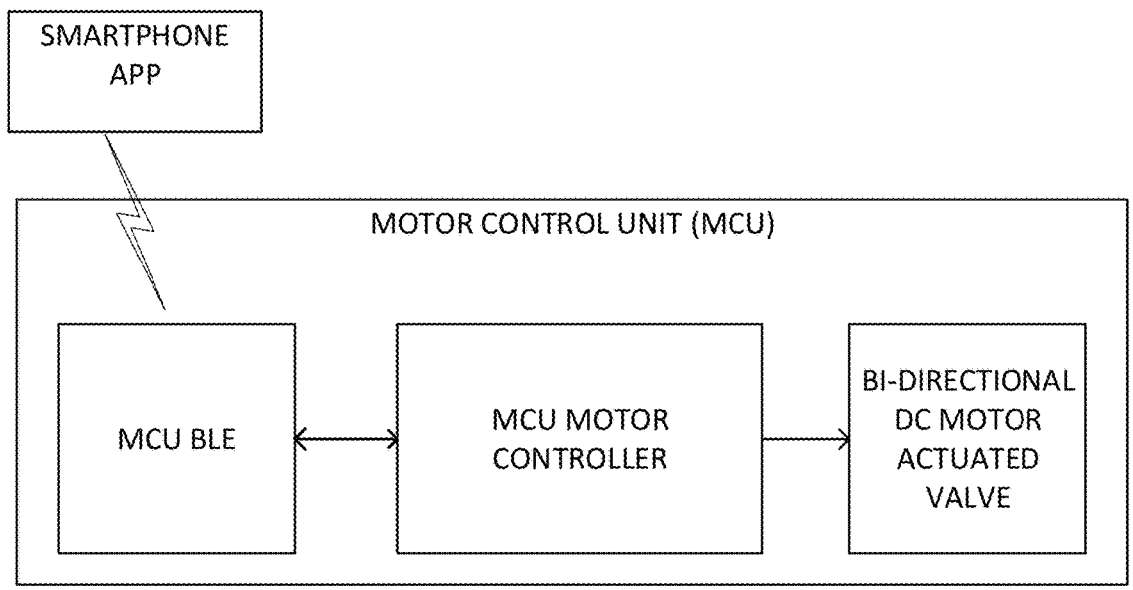
FIGS. 6A and 6B show a component view and a circuit diagram view, respectively, of the motor control unit (MCU) according to one embodiment of the invention.
Figure 6B:
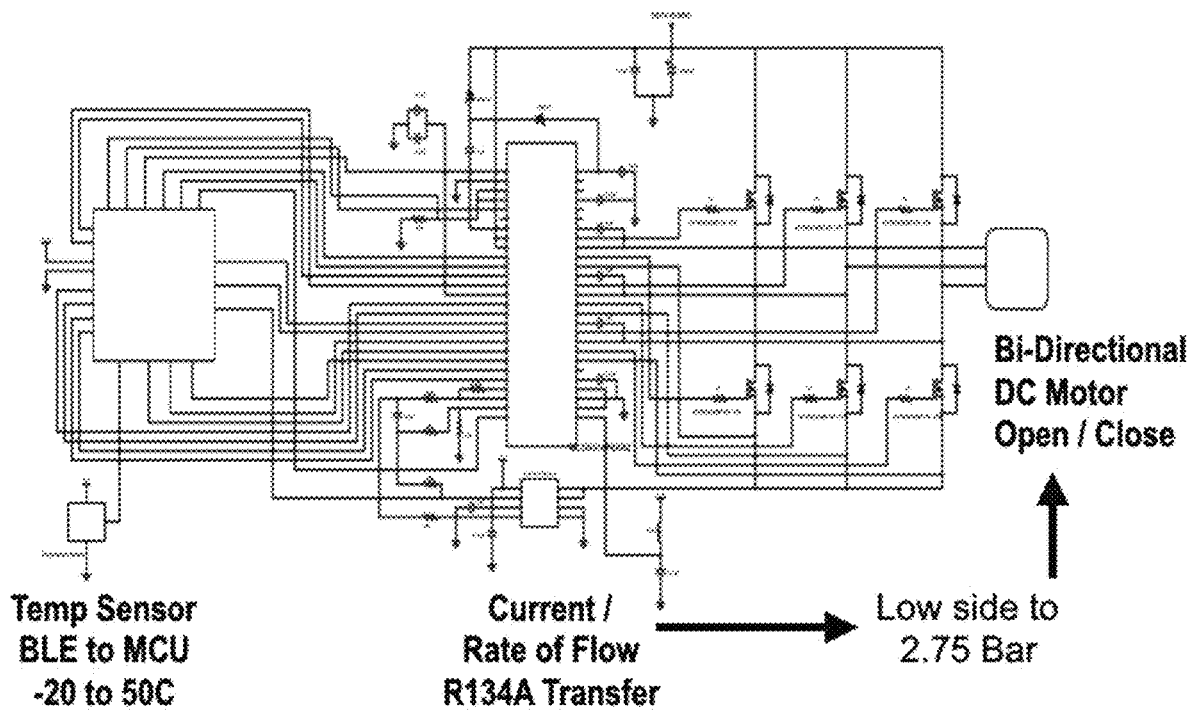

FIG. 6A depicts a component view of the motor control unit (MCU) according to one embodiment of the invention. In a one embodiment, as shown in FIG. 6B, the motor control unit includes a BLE-enabled MCU, an MCU motor controller, and a bi-directional motor-actuated valve controlled by an axially-mounted DC motor. Control logic may be powered by a low-cost lithium three (3) volt lithium battery 3V, such as the CR2032 lithium battery standard. One skilled in the art would understand that the motor control logic and motor-actuated valve may be powered by a variety of battery technologies, at different supply voltages, without loss of generality.

Figure 7:
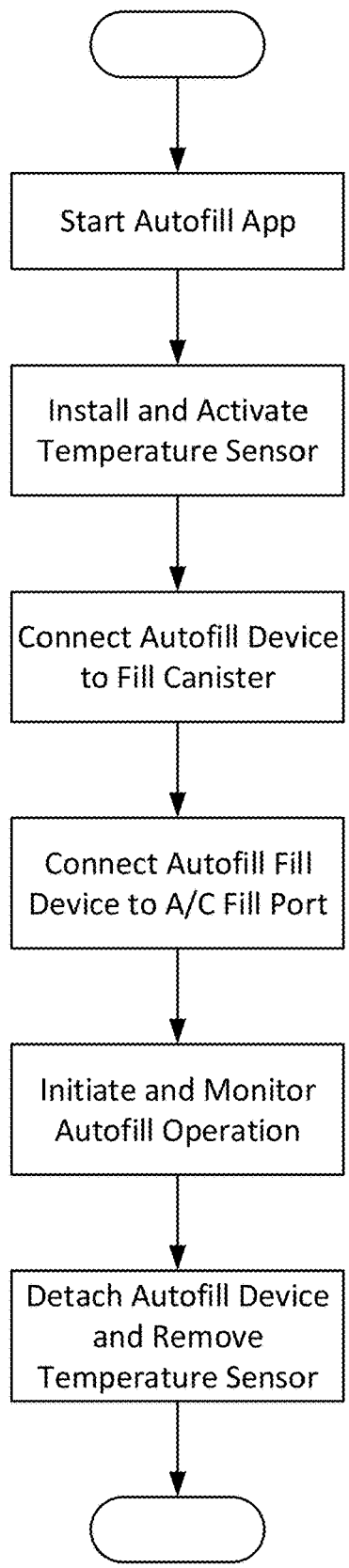
FIG. 7 is a flowchart showing a process of using the autofill system according to one aspect of the invention.

FIG. 7 depicts an exemplary process of employing the autofill system according to one aspect of the invention. At step 1, the user of the autofill system starts the autofill smartphone application. The smartphone application may guide the user through the remaining steps starting with step 2. At step 2, the user may activate the temperature sensor and install the wireless temperature sensor at an output vent of a vehicle A/C system as previously described. Upon installation of the temperature sensor, the user may to begin to pair the temperature sensor to smartphone application. Once successfully paired the temperature sensor may start transmitting temperature information, and the smartphone app may begin the display of temperature readings. Additionally, the smartphone app may display instructions to the user via the smartphone display module. Instructions to the user may include text and/or graphics illustrating proper connections and initiation of the autofill system components.

At step 3 of FIG. 7, the user may manually connect the autofill device to the fill canister as shown and described above. Additionally, the user may activate the autofill device motor controller unit (MCU) power supply by a manual switch as may be provided in some embodiments, to turn on the MCU and ready the MCU for receiving control signals via the wireless communications interface of the smartphone device. At step 4, the user may connect the autofill device via a hose or other suitable conveyance to the A/C system fill port. It is noted that the steps of starting the smartphone autofill app, installing and activating the temperature sensor, connecting the autofill device to the fill canister and to the A/C system fill port may be performed in another order than depicted in FIG. 7 without loss of generality. At step 5, the user may initiate and begin monitoring of the autofill process via the smartphone display. Upon completion of filling, at step 6, the user may disconnect the autofill device, remove the temperature sensor and close down the smartphone app, or continue to monitor temperature from the temperature sensor as the newly recharged air conditioning system continues to cool the interior of the vehicle.

Figure 8:
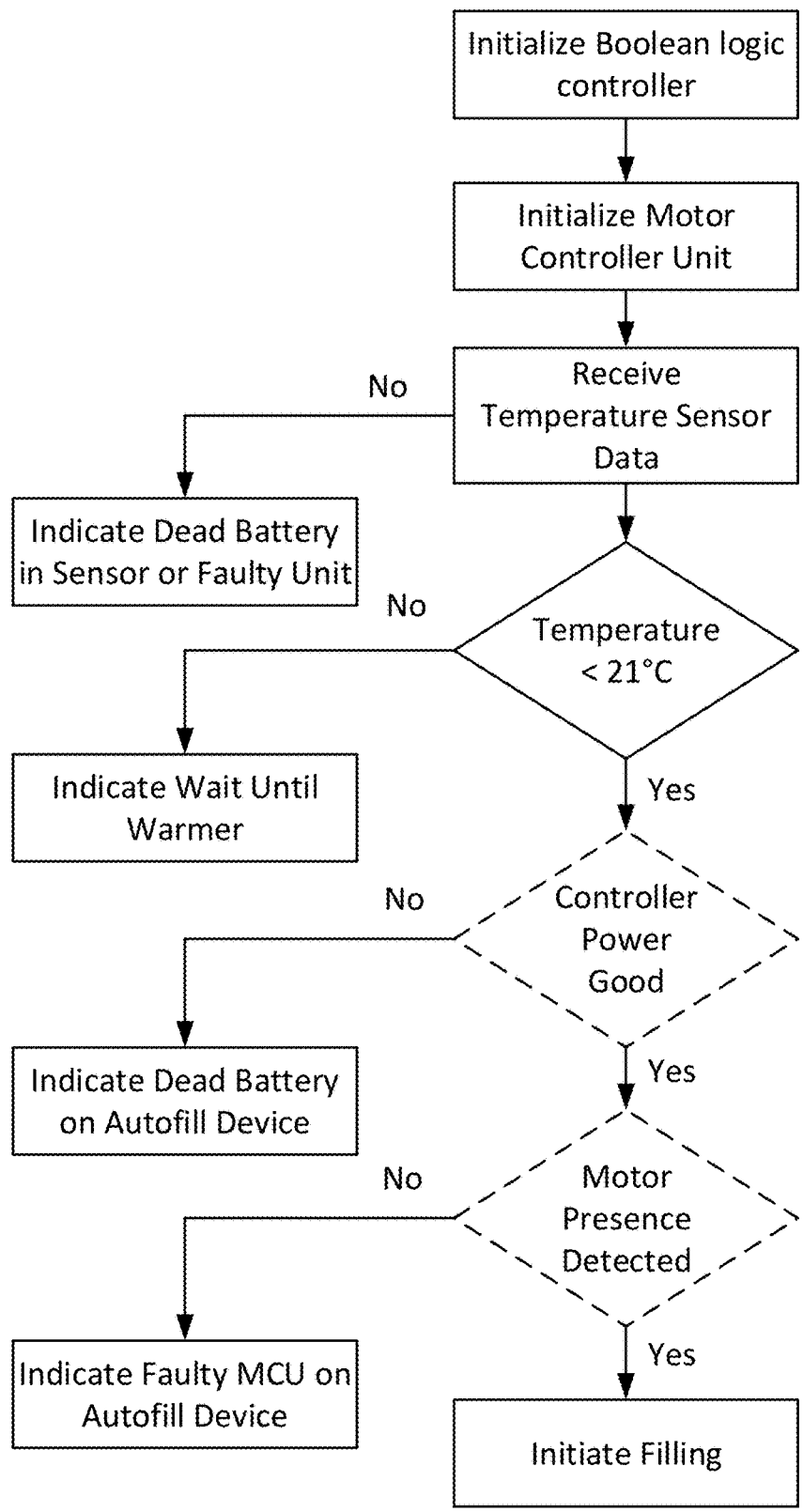
FIG. 8 is a flowchart showing an initialization process of the autofill application operating on the smartphone of the autofill system according to some embodiments of the invention.

FIG. 8 depicts an exemplary process of initiating of the smartphone app for performing the autofill control operation. Initialization of the Boolean logic controller may include loading into the Boolean logic state machine registers REG1, REG2, and REG3 pre-stored or default parameters of the sample time interval and temperature threshold. Alternatively, the smartphone app may present user controls for entry of the sample time interval and/or temperature threshold for loading into the state machine registers. Such parameters may be stored in a nonvolatile memory of the smartphone device. Initialization may include transmitting a command to the motor controller unit (MCU) to begin initialization as described below with reference to FIG. 9.

Returning to FIG. 8 the smartphone app may receive temperature sensor information from the wireless temperature sensor for the validation of initial conditions. For example, the smartphone app may verify that the initial temperature information received from the temperature sensor indicates that the temperature is within an acceptable range for proper operation of the autofill system. For example, in one embodiment, the initial temperature may be above 21° C. However, if the initial temperature reading is not above 21° C., the smartphone app may provide an indication to the user on the smartphone display that the autofill system cannot be operated at the initial temperature. It is noted that the initial acceptable temperature for refrigerant filling may be lower or higher than 21° C., such as within a range of 20-50° C.

In some embodiments, motor presence detect may be manually input by the user based on an indication from the autofill device such as an LED output, a multicolored LED output, an audible or other indicator. In other embodiments, alternatively, the autofill device may communicate automatically to the smartphone device a motor presence detect or controller power good indication. Such indications may be displayed as Status or as an Instruction.

Figure 9:
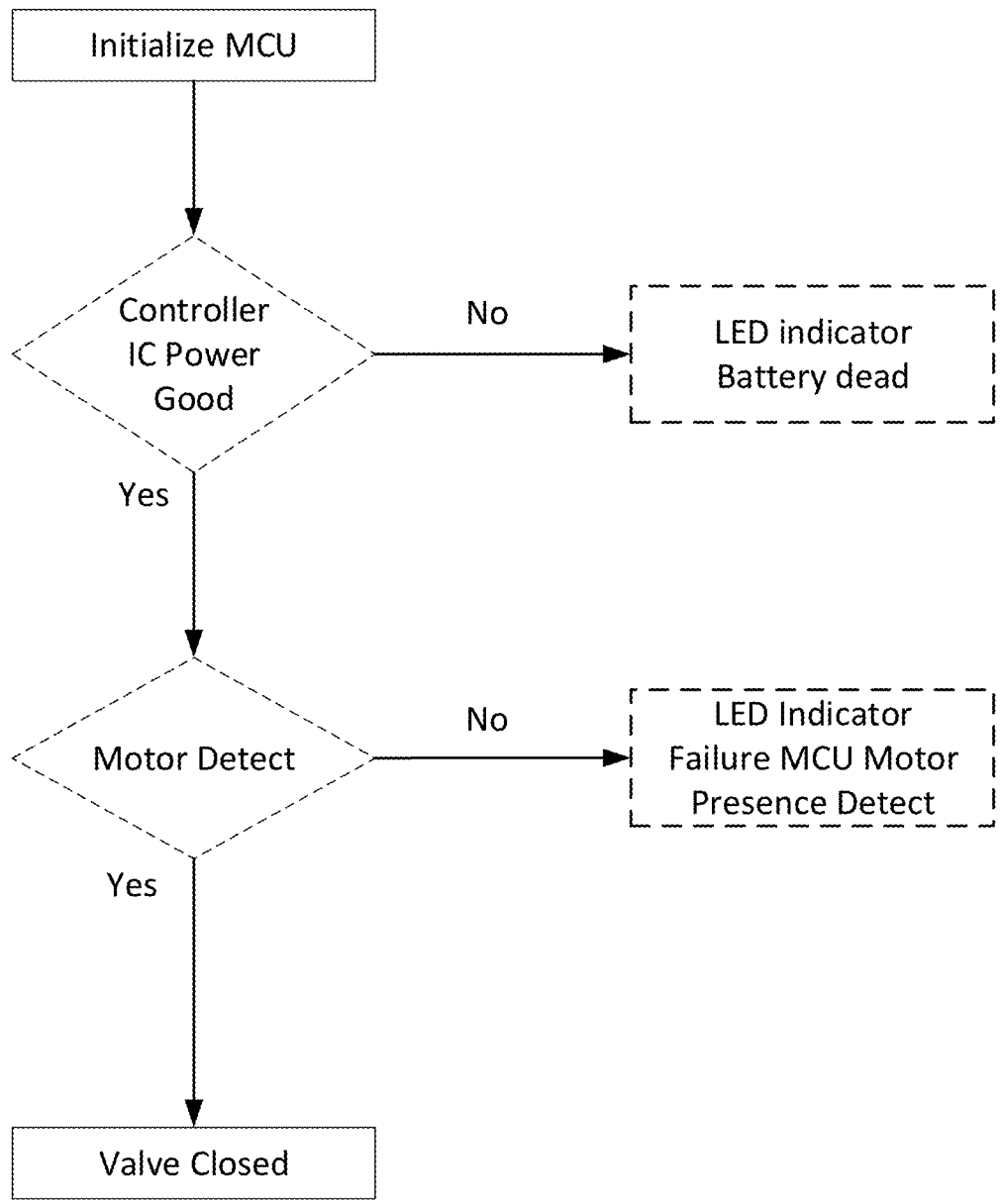
FIG. 9 is a flowchart showing an initialization process of the motor controller unit (MCU) operating on the autofill device according to some embodiments of the invention.

Initialization of the MCU is shown in the flowchart of FIG. 9. Initialization may begin upon power up or upon receiving a command via wireless communications from the smartphone device to the MCU. Such communications may cause the MCU to begin a self-check initialization of the MCU modules and to place the autofill device in a "ready" state for the filling of refrigerant. As depicted in FIG. 9, the MCU initialization process may include a motor presence detect step, a controller power detect step, and a step for ensuring the proper closing of the refrigerant valve prior to the beginning of fill logic operation. In some embodiments, initialization of the MCU may indicate that the controller IC power is good with an LED indicator. In some embodiments, the MCU may detect motor presence by a characteristic impedance measured at the dc motor by the MCU or the dc motor controller when valve is closed, indicating that the MCU, the, dc motor controller, and the dc motor controlled valve is operational and can control refrigerant filling.

Upon successful initialization of the smartphone app and the MCU, the motor controlled valve is open, and thus autofilling may begin under the control of the smartphone app and the Boolean conditional logic controller.

Figure 10:
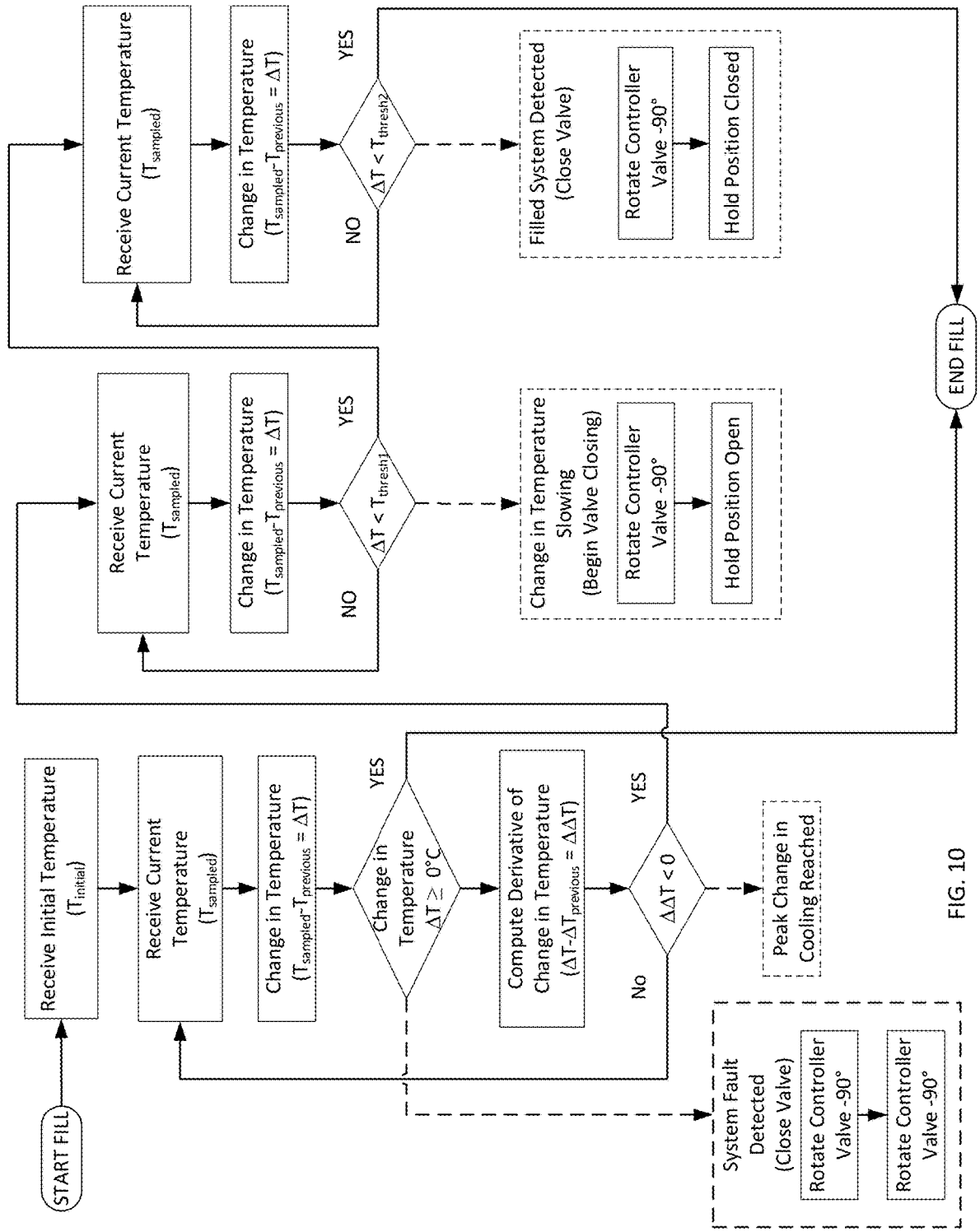
FIG. 10 depicts a process of autofilling under the control of the smartphone app and Boolean conditional logic controller in communication with the autofill device.

FIG. 10 depicts the process of autofilling under the control of the smartphone app and Boolean conditional logic controller. Temperature information is received from the wireless temperature sensor as the initial temperature at the start of the fill operation. In a next time interval, sampled temperature information is again received from the wireless sensor. The received temperature sensor information is then compared to the initial temperature to determine the change in temperature ΔT from the initial sample interval to the current sample interval.

It is noted that upon initialization of the MCU, the MCU's motor controlled valve is closed, and thus refrigerant is prevented from entering the A/C system. Upon initiation of filling, temperature reductions measured at the output vent of the A/C system can be expected. When the refrigerant valve is open, the previous temperature and the sampled temperature at the current time interval should indicate a decrease in temperature at the output vent. A decrease in temperature is indicated by a lower sampled temperature (ΔT<0) in the current time interval than previously measured. Thus, if $\Delta T=T_2-T_1 \geq 0°$ C., the temperature at the output vent has increased relative to the prior time period indicating a failure to cause additional cooling by the A/C system from increased refrigerant, thereby indicating a potential fault in the A/C system. Such faults may include an "open system" condition indicating a potential leak. Upon detecting an open system condition, the smartphone app may transmit to the MCU a command to close the motor controlled value.

Continuing in FIG. 10, the Boolean logic controller determines when a peak change in the additional cooling of the recharging air conditioning system has occurred. In one embodiment, as shown in FIG. 10, the peak change in additional cooling may be reached when the derivative of the change in temperature (ΔΔT) is zero or substantially zero. Peak additional cooling may be detected when the additional change in cooling has remained constant for a single sample time interval, or for two or more sample time intervals, or by a variable limit of additional cooling based on a theoretical or design limit to the A/C under recharge. In some embodiments, peak cooling may be determined by an elapsed time in combination with the sampled temperature and the change in temperature at a time interval or range of time intervals.

Following detection of peak cooling, control continues into subsequent time intervals, receiving a sampled temperature and comparing the change in temperature to a first threshold $\Delta T_{thresh1}$ to determine if the additional refrigerant filling has resulted in a reduction of additional cooling at the output vent. If the change in temperature ΔT in the currently sample interval indicates that cooling has slowed below a threshold of a change in cooling, that is, $\Delta T<\Delta T_{thresh1}$ then the fill rate may be slowed by causing the MCU to close the motor controlled valve, in some embodiments, by a first −90° and then holding the position of the valve open. However, if the change in temperature ΔT in the current sample interval does not indicate that cooling has slowed below a threshold of a change in cooling, that is, $\Delta T \geq \Delta T_{thresh1}$ then filling may continue at the current fill rate.

Refrigerant filling as slowed by the closing of the motor controlled valve would be expected to further decrease the change in temperature in successive time intervals, but at a slower rate of change. Thus, with continued sampling at successive time intervals, the change in temperature ΔT may be compared to a second threshold $\Delta T_{thresh2}$. If $\Delta T<\Delta T_{thresh2}$ then filling has fully completed and the motor controlled valve is fully closed by rotation of the motor controller by a second −90°.

Figure 11:
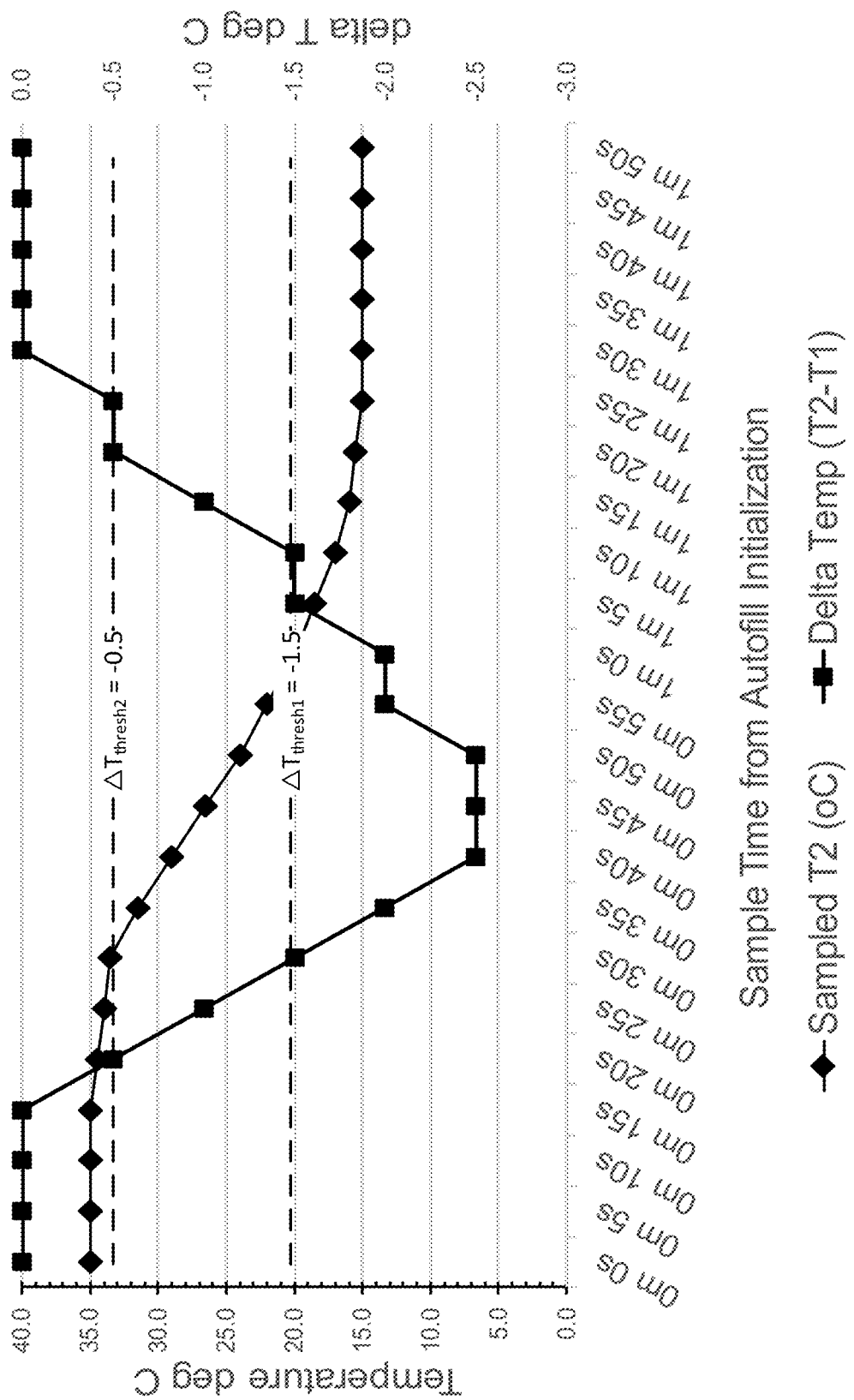
FIG. 11 is graph depicting an example of temperature cooling during recharging, according to one embodiment of the air conditioning autofill overfill protection temperature sensing air conditioning coolant recharge device.

FIG. 11 is graph depicting an example of temperature cooling during recharging, according to one embodiment of the air conditioning autofill overfill protection temperature sensing air conditioning coolant recharge device. In the example given, with reference to FIG. 9, the initial temperature is 35° C., decreasing to about 30° C. at peak change in cooling (between 40 and 50 seconds of elapsed time). Change in temperature thresholds $\Delta T_{thresh1}$ and $\Delta T_{thresh2}$ for slowing and then stopping refrigerant fill are −1.5° C. and −0.5° C., respectively. It is noted that the Fill Logic Example of FIG. 10 is exemplary only for the autofill operation as depicted in FIG. 9 with such variations and equivalents would be understood to one skilled in the art.

FIG. 12 is table of inputs, outputs, register values, messages, states and actions of an example of temperature cooling during recharging, according to one embodiment of the air conditioning autofill overfill protection temperature sensing air conditioning coolant recharge device.

FIG. 13 is table of inputs, outputs, register values, messages, states and actions of an example of temperature cooling during recharging when a system fault is detected part way through the filling operation.

The present disclosure provides, generally, computer and logic circuit-controlled devices configured to implement the methods and systems described above. Such devices may include central processing units (CPU) (e.g., processors) which may include or be in communication with memory (e.g., random-access memory, read-only memory, flash memory), electronic storage units (e.g., static RAM, memory stick, SDRAM modules), communication interfaces (e.g., network adapters, wireless adapters) for communicating with one or more other systems, and peripheral devices, such as cache, other memory, data storage and/or electronic display adapters, include touch-sensitive graphical display devices. Memory, storage units, interfaces, and peripheral devices are known to be communications with the CPU processors through communication buses, which may be a motherboard or a backplane of a computing or controller device. Computer or controller devices may be operatively coupled to a computer network (e.g. the internet) by one or more communications interfaces.

Computer processes implementing the control logic of the present invention may execute a sequence of machine-readable instructions, which can be embodied in a program or software. The instructions may be stored in a memory location. The instructions can be directed to the processor, which can subsequently program or otherwise configure the processor to implement methods of the present disclosure. Processors may be part of a circuit, such as an integrated circuit and one or more other components or modules of the computer systems may be included in a circuit, for example, in some cases, the circuits may be an application specific integrated circuit (ASIC).

Memory storage may store files, such as drivers, libraries and saved programs. Storage units may store user data, e.g., user preferences and user programs. Methods as described herein may be implemented by way of machine (e.g., CPU, processor) executable code stored on an electronic storage location of the computer or controller device. Machine executable or machine-readable code may be provided in the form of software. During use, the code may be executed by the processor, retrieved from the storage unit and stored on the memory for ready access by the processor. In some situations, machine-executable instructions may be stored directly to memory. Computer codes may be pre-compiled and configured for use with a machine have a processer adapted to execute the code or can be compiled during runtime. The code can be supplied in a programming language that can be selected to enable the code to execute in a pre-compiled or as compiled fashion.

As described herein, various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable updating of the software, for example, from a management server or host computer into the computer platform of an application server.

As used herein, unless restricted to non-transitory, tangible "storage" media, terms such as computer or machine "readable medium" refer to any medium that participates in providing instructions to a processor for execution. Machine readable medium may take many forms, including but not limited to, a tangible storage medium, a carrier wave medium or physical transmission medium. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system can include or be in communication with an electronic display that comprises a user interface (UI) or a graphical user interface (GUI) for providing, for example, user interfaces associated with the system. Methods and systems of the present disclosure can be implemented by way of one or more algorithms. An algorithm can be implemented by way of software upon execution by a CPU/processor.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions may occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention.

It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method for servicing a vehicle coolant system, the method comprising:
receiving temperature sensor information at predetermined periodic intervals from a temperature sensor transmitting air vent temperature information at an output air vent of an air conditioning system within a vehicle passenger compartment;
actuating refrigerant filling into the vehicle coolant system;
determining from the temperature sensor information an initial negative change in temperature ($\Delta$Tinitial) from a first time interval (Tprevious) to a second time interval (Tsampled);
continuing the refrigerant filling while determining subsequent changes in temperature ($\Delta$Tsubsequent) at a plurality of successive time intervals; and
comparing the $\Delta$Tsubsequent at each time interval against a predetermined temperature change target (Tthreshold) to determine whether to continue the refrigerant filling or to stop the refrigerant filling;
wherein the refrigerant filling is continued if at one or more of the successive time intervals $\Delta$Tsubsequent>Tthreshold and stopped when at one or more of the successive time intervals $\Delta$Tsubsequent<Tthreshold.

2. The method of claim 1, further comprising determining whether a predetermined value representing a peak change in cooling has been reached by computing the derivative of $\Delta$T ($\Delta\Delta$T) and comparing the computed value to the predetermined value.

3. The method of claim 2 wherein computing is performed using a Boolean logic controller.

4. The method of claim 1 wherein the refrigerant filling is performed via a refrigerant fill valve and the refrigerant filling is stopped by using a controller to close the valve.

* * * * *